United States Patent [19]  
Minagawa et al.

[11] 4,423,174  
[45] Dec. 27, 1983

[54] SYNTHETIC RESIN COMPOSITIONS CONTAINING 2,2,6,6-TETRAMETHYL PIPERIDYL ETHERS

[75] Inventors: Motonobu Minagawa, Koshigaya; Naohiro Kubota, Ageo; Ryoji Kimura, Urawa, all of Japan

[73] Assignee: Adeka Argus Chemical Co., Ltd., Urawa, Japan

[21] Appl. No.: 401,481

[22] Filed: Jul. 26, 1982

[30] Foreign Application Priority Data

Aug. 20, 1981 [JP] Japan ................... 56-129349

[51] Int. Cl.³ ............... C07D 401/02; C07D 405/30; C08K 5/34; C08K 5/51
[52] U.S. Cl. .................... 524/99; 524/102; 524/117; 524/120; 524/128; 524/147; 524/333; 546/187; 546/188; 546/190; 546/207
[58] Field of Search ............... 524/99, 102, 147, 148, 524/151, 153, 108, 110, 117, 109, 120, 128, 336, 338, 341, 333, 342, 344, 325, 99; 546/187, 188, 190, 207

[56] References Cited

U.S. PATENT DOCUMENTS 3,640,928  2/1972  Murayama et al. ............ 524/99  
4,128,608  12/1978  Minagawa et al. ............ 524/102  
4,210,577  7/1980  Minagawa et al. ............ 524/102  
4,222,931  9/1980  Minagawa et al. ............ 524/102  
4,234,699  11/1980  Rody et al. ............ 525/55

Primary Examiner—John Kight, III  
Assistant Examiner—Kriellion Morgan

[57] ABSTRACT

Synthetic resin compositions of improved resistance to deterioration by heat and light are provided containing a 2,2,6,6-tetramethyl piperidyl ether having the formula:

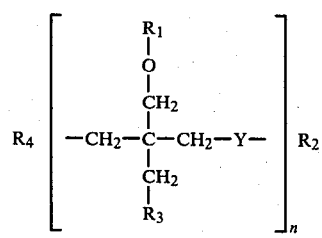

The compounds of the invention can be prepared by the reaction of the 2,2,6,6-tetramethyl piperidyl alcohol $R_1$-OH with (poly) trimethylol alkane, (poly) pentaerthritol, or an alcohol containing an oxetane ring, to form the ether.

The etherification is carried out by the conventional method, for example, by the reaction of $R_1$-OH with the organic sulfonate of the above-mentioned alcohols, or by the reaction of $R_1$-OH with the halogenated above-mentioned alcohols in the presence of an alkali or acid acceptor.

The compounds where n is equal to 2 or more can be prepared by chain opening polymerization of the corresponding compound containing the oxetane ring.

43 Claims, No Drawings

SYNTHETIC RESIN COMPOSITIONS CONTAINING 2,2,6,6-TETRAMETHYL PIPERIDYL ETHERS

Many synthetic polymers such as polyethylene, polypropylene, ABS resin, polyvinyl chloride, and polyurethanes undergo degradation with a resulting deterioration in physical properties, such as discoloration and a loss of mechanical strength, upon exposure to light.

Consequently, a variety of light stabilizers have been proposed to inhibit such deterioration. However, the available light stabilizers are unsatisfactory, some being destroyed by heat and oxidation, others being extracted by water or organic solvents, and some imparting color to the polymers.

2,2,6,6-Tetraalkyl piperidine compounds do not impart color to the polymer, and act as quenchers. However, the available piperidine compounds are unsatisfactory in stabilizing effectiveness, are so volatile that they are lost when the polymer is heated at elevated temperatures, and are extracted by water.

Murayama et al U.S. Pat. No. 3,640,928, patented Feb. 8, 1972, discloses the stabilization of synthetic polymers against photo- and thermo-deterioration thereof by incorporating therein a piperidine derivative having the general formula

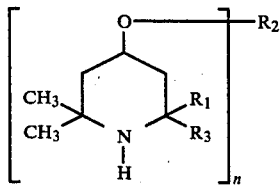

or a salt thereof.

In the above Formula I: $R_1$ and $R_2$, which may be the same or different, each are an alkyl group such as methyl, ethyl, isopropyl or dodecyl, or they form, together with the carbon atom to which they are attached, a saturated alicyclic group such as

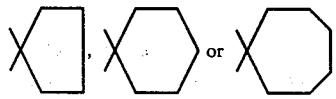

or a group of the formula

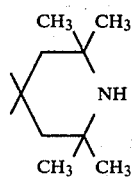

n is an integer of 1 to 3 inclusive; and

When n is 1, $R_3$ is an acyl group derived from an aliphatic, alicyclic or heterocyclic monocarboxylic acid; an N-substituted carbamoyl group derived from an N-substituted carbamic acid; an N-substituted thiocarbamoyl group derived from an N-substituted thiocarbamic acid; a monovalent group obtained by removing a hydroxyl group from an oxoacid; an alkyl group; a cycloalkyl group; an aralkyl group; an aryl group; or a group of the general formula

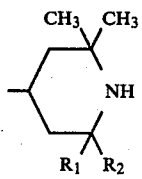

(wherein $R_1$ and $R_2$ are as defined above);

When n is 2, $R_3$ is a diacyl group derived from an aliphatic, alicyclic, aromatic or heterocyclic dicarboxylic acid; a dicarbamoyl group derived from dicarbamic acid; a bisthiocarbamoyl group derived from bisthiocarbamic acid; a carbonyl group; a divalent group obtained by removing two hydroxyl groups from an oxacid; an alkylene group; an arylene group; or an arylenedialkylene group; and When n is 3, $R_3$ is a triacyl group derived from an aliphatic, alicyclic, aromatic or heterocyclic tricarboxylic acid; a tricarbamoyl group derived from tricarbamic acid; a tristhiocarbamoyl group derived from tristhiocarbamic acid; a trivalent group obtained by removing three hydroxyl groups derived from an oxacid; an alkanetriyl group; arenetriyl group; or an arenetriyltrialkylene group.

Murayama et al U.S. Pat. No. 3,899,464 patented Aug. 12, 1975, provides piperidine derivatives as stabilizers for polymeric materials having the formula:

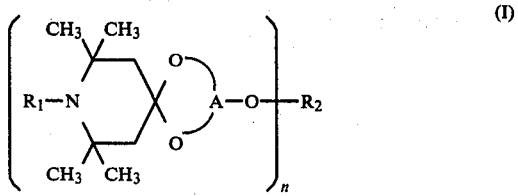

wherein $R_1$ represents hydrogen atom, an alkyl group, a substituted alkyl group, an alkenyl group, an alkenyl group, a substituted or unsubstituted aralkyl group, an aliphatic acyl group, an alkoxycarbonyl group or an aralkoxycarbonyl group, n is an integer of 1 to 4; when n is 1, $R_2$ represents hydrogen atom, an aliphatic, aromatic or heterocyclic monoacyl group, an alkyl group, an alkenyl group, an alkynyl group, an aralkyl group, an aryl group, an alkoxyalkyl group, an epoxyalkyl group, an alkoxysulfonylalkyl group, N-substituted carbamoyl group, a N-substituted thiocarbamoyl group, a monovalent group from an oxoacid or group

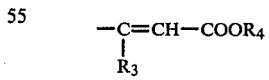

in which $R_3$ represents hydrogen atom, a lower alkyl group or phenyl group and $R_4$ represents an alkyl group; when n is 2, $R_2$ represents carbonyl group, an aliphatic or aromatic diacyl group, an alkylene group, an alkenylene group, an alkynylene group, an aralkylene group, a N-substituted dicarbamoyl group or a divalent group from an oxoacid; when n is 3, $R_2$ represents an aromatic triacyl group or a trivalent group from an oxoacid; and when n is 4, $R_2$ represents an aromatic tetraacyl group, and A represents a group

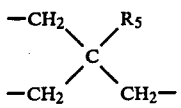

in which R<sub>5</sub> represents hydrogen atom or a lower alkyl group or, when n is 1, R<sub>5</sub> may represent together with R<sub>2</sub> a group

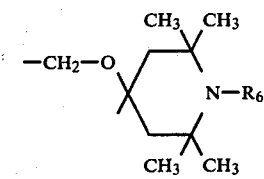

in which $R_6$ represents the same group as defined in $R_1$ and may be the same or different from $R_1$, or a group

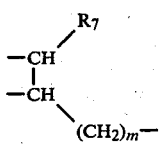

in which m is a 1 or 2 and $R_7$ represents hydrogen atom or, when n and m are 1, $R_7$ represents methylene group together with $R_2$.

Murayama et al U.S. Pat. No. 4,016,168, patented Apr. 5, 1977, discloses piperidine derivatives as stabilizers for polymeric materials having the formula:

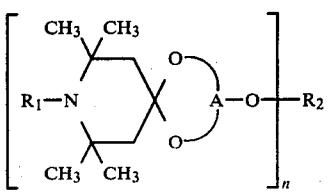

(I)

wherein $R_1$ represents hydrogen atom, an alkyl group, a substituted alkyl group, an alkenyl group, an alknyl group, a substituted or unsubstituted aralkyl group, an aliphatic acyl group, an alkoxycarbonyl group or an aralkoxycarbonyl group, n is an integer of 1 to 4; when n is 1, $R_2$ represents hydrogen atom, an aliphatic, aromatic or heterocyclic monoacyl group, an alkyl group, an alkenyl group, an alkynyl group, an aralkyl group, an aryl group, an alkoxyalkyl group, an epoxyalkyl group, an alkoxysulfonylalkyl group, a N-substituted carbamoyl group, a N-substituted thiocarbamoyl group, a monovalent group from an oxoacid or group

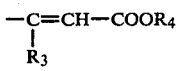

in which $R_3$ represents hydrogen atom, a lower alkyl group or phenyl group and $R_4$ represents an alkyl group; when n is 2, $R_2$ represents carbonyl group, an aliphatic or aromatic diacyl group, an alkylene group, an alkenylene group, an alkynylene group, an aralkylene group, a N-substituted dicarbamoyl group or a divalent group from an oxoacid; when n is 3, $R_2$ represents an aromatic triacyl group or a trivalent group from an oxoacid; and when n is 4, $R_2$ represents an aromatic tetracyl group, and A represents a group

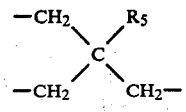

in which $R_5$ represents hydrogen atom or a lower alkyl group or, when n is 1, $R_5$ may represent together with $R_2$ a group

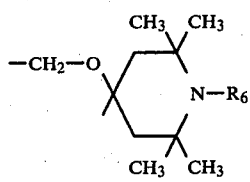

in which $R_6$ represents the same group as defined in $R_1$ and may be the same or different from $R_1$, or a group

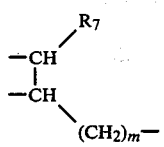

in which m is 1 or 2 and $R_7$ represents hydrogen atom or, when n and m are 1, $R_7$ represents methylene group together with $R_2$.

Murayama et al U.S. Pat. No. 4,212,974, patented July 15, 1980, provides piperidine derivatives as stabilizers for polymeric materials having the formula:

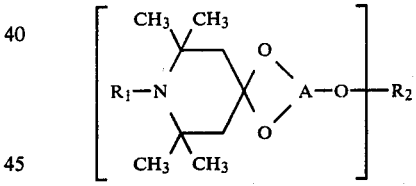

(I)

wherein $R_1$ represents hydrogen atom, an alkyl group, a substituted alkyl group, an alkenyl group, an alknyl group, a substituted or unsubstituted aralkyl group, an aliphatic acyl group, an alkoxycarbonyl group or an aralkoxycarbonyl group, n is an integer of 1 to 4; when n is 1, $R_2$ represents hydrogen atom, an aliphatic, aromatic or heterocyclic monoacyl group, an alkyl group, an alkenyl group, an alkynyl group, an aralkyl group, an aryl group, an alkoxyalkyl group, an epoxyalkyl group, an alkoxysulfonylalkyl group, a N-substituted carbamoyl group, a N-substituted thiocarbamoyl group, a monovalent group from an oxoacid or group

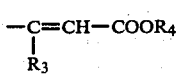

in which $R_3$ represents hydrogen atom, a lower alkyl group or phenyl group and $R_4$ represents an alkyl group; when n is 2, $R_2$ represents carbonyl group, an aliphatic or aromatic diacyl group, an alkylene group, an alkenylene group, an alkynylene group, an aralkylene group, a N-substituted dicarbamoyl group or a divalent group from an oxoacid; when n is 3, $R_2$ represents an aromatic triacyl group or a trivalent group from an oxoacid; and when n is 4, $R_2$ represents an aromatic tetraacyl group, and A represents a group

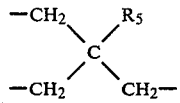

in which $R_5$ represents hydrogen atom or a lower alkyl group or, when n is 1, $R_5$ may represent together with $R_2$ a group

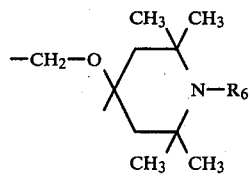

in which $R_6$ represents the same group as defined in $R_1$ and may be the same or different from $R_1$, or a group

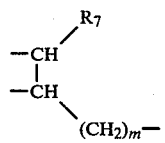

in which n is 1 or 2 and $R_7$ represents hydrogen atom or, when n and m are 1, $R_7$ represents methylene group together with $R_2$.

Rody et al U.S. Pat. No. 4,234,699, patented Nov. 18, 1980 provides polymeric light stabilizers which are condensation polymers and addition polymers which contain a sterically hindered polyalkylpiperidine radical of the formula

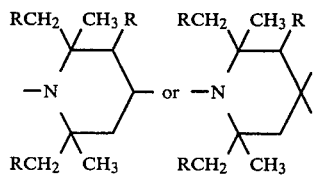

or is substituted by a polyalkylpiperidine side group of the formula

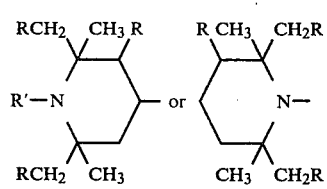

in which R denotes hydrogen or alkyl with 1–5 C atoms and R' denotes hydrogen, alkyl with 1–12 C atoms alkenyl with 3–8 C atoms, alkinyl with 3–6 C atoms, aralkyl with 7–12 C atoms, alkanoyl with 1–8 C atoms or alkenoyl with 3–5 C atoms, and to copolymers with one another or with polyalkylpiperidine-free components.

In accordance with the present invention, synthetic resin compositions of improved resistance to deterioration by heat and light are provided containing a 2,2,6,6-tetramethyl piperidyl ether having the formula:

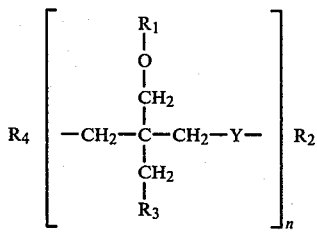

wherein: $R_1$ is selected from the group consisting of

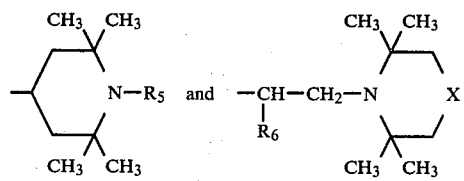

$R_2$ is selected from the group consisting of hydrogen, alkyl, hydroxyalkyl, saturated and unsaturated acyl having from one to about eighteen carbon atoms; $R_1$ and

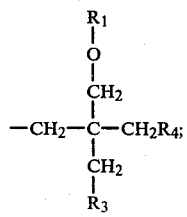

$R_3$ is selected from the group consisting of hydrogen, alkyl and hydroxyalkyl having from one to about eighteen carbon atoms; cycloalkyl and alkylphenyl having from six to about eighteen carbon atoms; and $-OR_1$;

$R_4$ is selected from the group consistng of hydroxyl, alkoxy having from one to about ten carbon atoms, acyloxy having from one to about ten carbon atoms, and $-OR_1$;

$R_5$ is selected from the group consisting of hydrogen, oxy; alkyl, hydroxyalkyl and alkenyl having from one to about eighteen carbon atoms; cycloalkyl and alkylphenyl having from six to about eighteen carbon atoms;

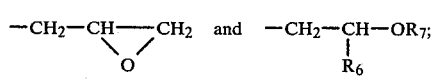

$R_6$ is selected from the group consisting of hydrogen, alkyl and hydroxyalkyl having from one to about eighteen carbon atoms; cycloalkyl and alkylphenyl having from six to about eighteen carbon atoms;

$R_7$ is hydrogen or acyl having from one to about eighteen carbon atoms;

$R_8$ is alkylene having from one to about ten carbon atoms;

X is selected from the group consisting of methylene, —CH$_2$—, carbonyl C=O, >CH—O—R$_7$ and

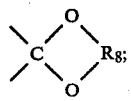

Y is oxy —O— or 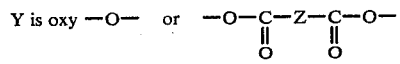

where Z is alkylene or thioalkylene having from two to about ten carbon atoms; or phenylene having from six to about ten carbon atoms; and n is a number from 1 to 50; R$_2$ and R$_3$; or R$_2$ and R$_4$ can be taken together to form

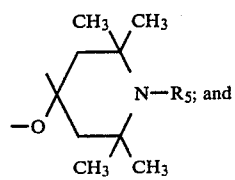

when n is 1 and Y is —O—, R$_2$ and R$_3$ or R$_2$ and R$_4$ can be connected together as a C—C linkage to form a cyclic ring, or

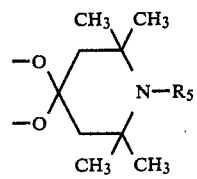

Exemplary alkyl represented by R$_2$, R$_3$, R$_5$ and R$_6$ are methyl, ethyl, propyl, isopropyl, butyl, isobutyl, tert-butyl, iso-amyl, n-amyl, hexyl, octyl, 2-ethyl hexyl, isooctyl, decyl, dodecyl, tetradecyl and octadecyl.

Exemplary hydroxy alkyl include hydroxy ethyl, hydroxy propyl, hydroxy butyl, hydroxy hexyl, hydroxy dodecyl and hydroxy stearyl.

Exemplary cycloalkyl include cyclopropyl, cyclobutyl, cyclopentyl, cyclohexyl, cycloheptyl and cyclooctyl.

Exemplary alkyl phenyl include benzyl, phenethyl, xylyl, mesityl, phenpropyl and phenhexyl.

Exemplary alkenyl represented by R$_5$ are vinyl, allyl, butenyl, hexenyl, octenyl, oleyl, linoleyl and ricinoleyl.

Exemplary acyl represented by R$_2$ and R$_7$ are derived from the following carboxylic acids: formic acid, acetic acid, propionic acid, butyric acid, pivalic acid, octanoic acid, lauric acid, palmitic acid, stearic acid, acrylic acid, crotonic acid, oleic acid, acetoacetic acid, levulinic acid, pyruvic acid, 12-keto stearic acid, aminoacetic acid, dodecylmercapto propionic acid, 3,5-di-t-butyl-4-hydroxyphenyl propionic acid, benzoic acid, toluic acid, 4-t-butyl benzoic acid, 3,5-di-t-butyl-4-hydroxy benzoic acid, nicotinic acid, isonicotinic acid and 2,2,6,6-tetramethyl-piperidine-4-carboxylic acid.

Exemplary alkylene represented by R$_6$ are ethylene, 1,2-propylene, 1,3-propylene, 2,2-dimethyl-1,3-propylene, 1,2-butylene, 1,2-hexylene and 1,2-octylene.

Exemplary dicarboxylic acid residues represented by Z are derived from the following dicarboxylic acids: oxalic acid, malonic acid, succinic acid, glutaric acid, adipic acid, sebacic acid, azelaic acid, decamethylene dicarboxylic acid, maleic acid, itaconic acid, tartaric acid, maleic acid, thiodipropionic acid, diglycolic acid, thiodiglycolic acid, phthalic acid, isophthalic acid, terephthalic acid, hexahydrophthalic acid, and tetrahydrophthalic acid.

Typical compounds falling within Formula (I) are:

1.

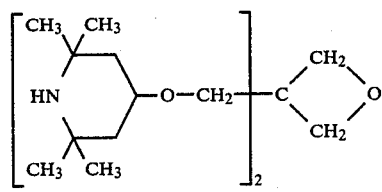

2.

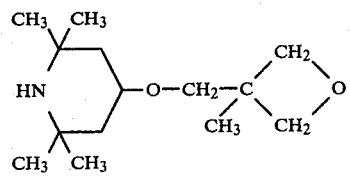

3.

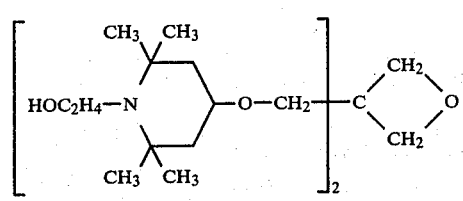

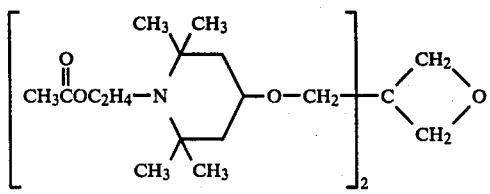
4.
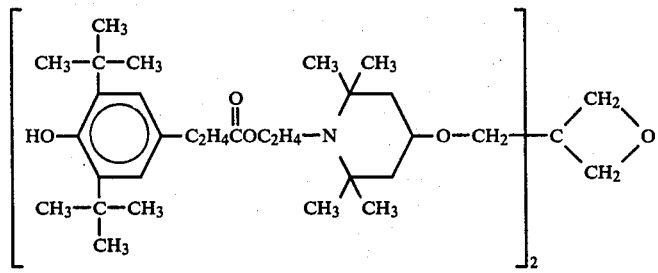
5.
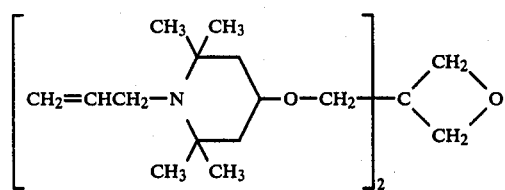
6.
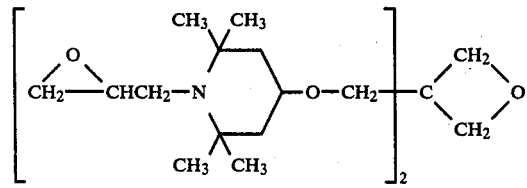
7.
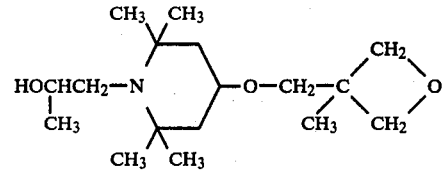
8.
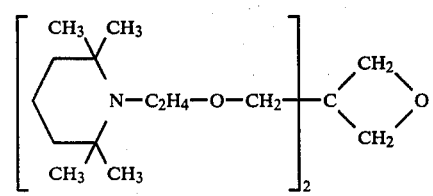
9.
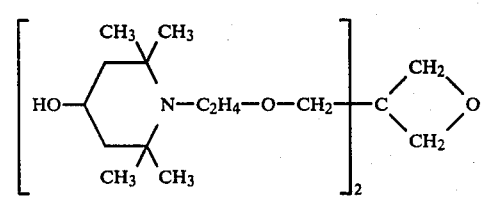
10.

-continued
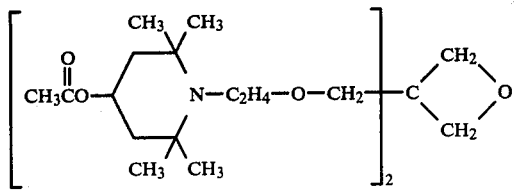
11.
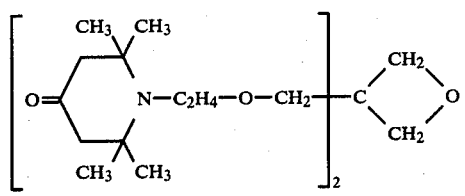
12.
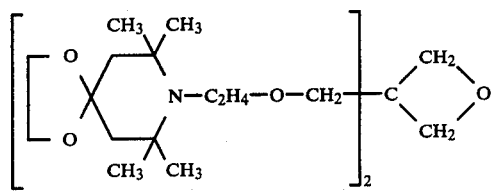
13.
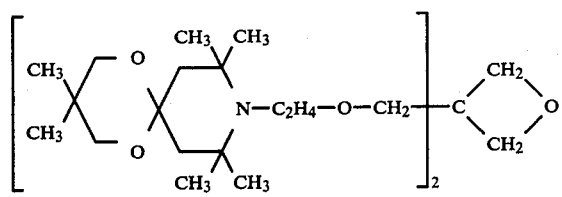
14.
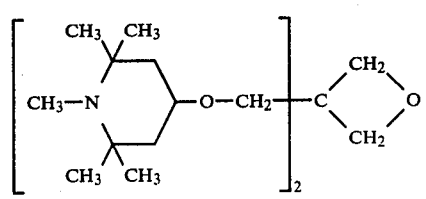
15.
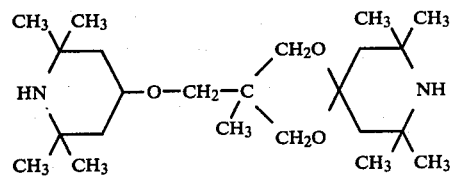
16.
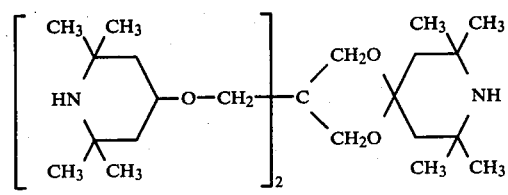
17.
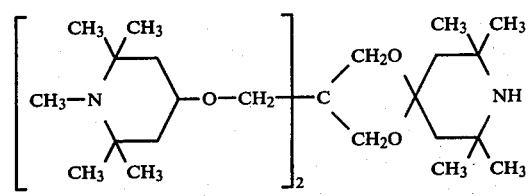
18.

-continued
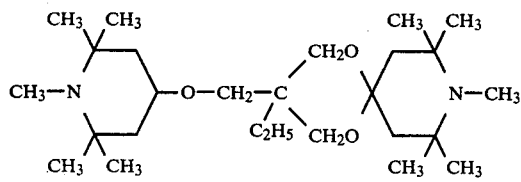
19.
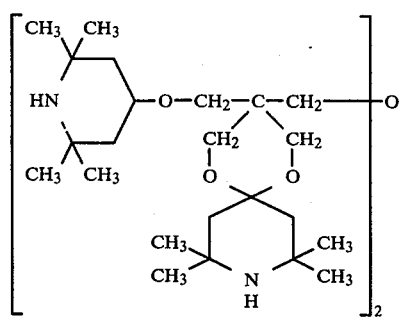
20.
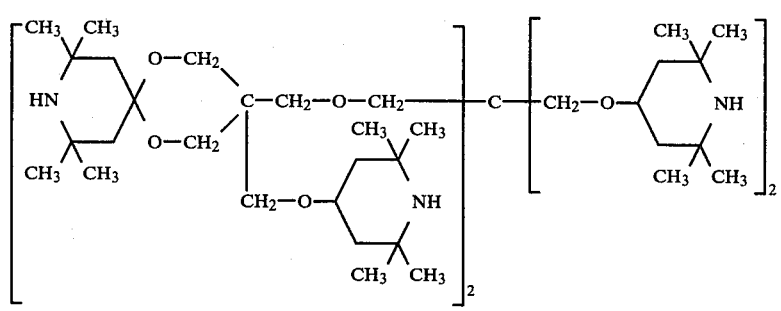
21.
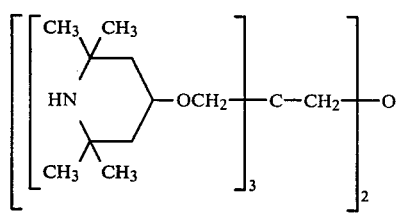
22.
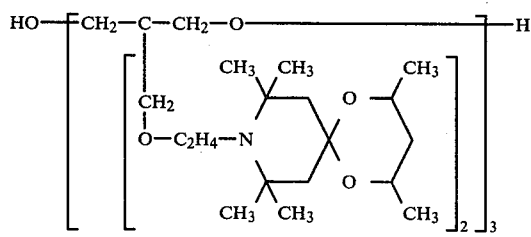
23.
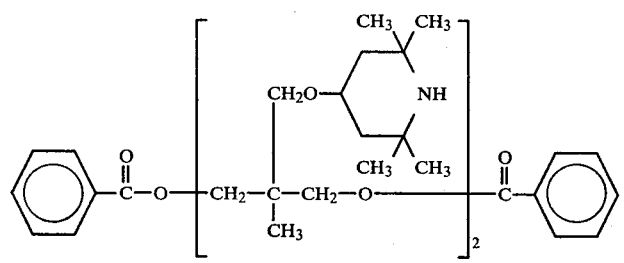
24.

25.
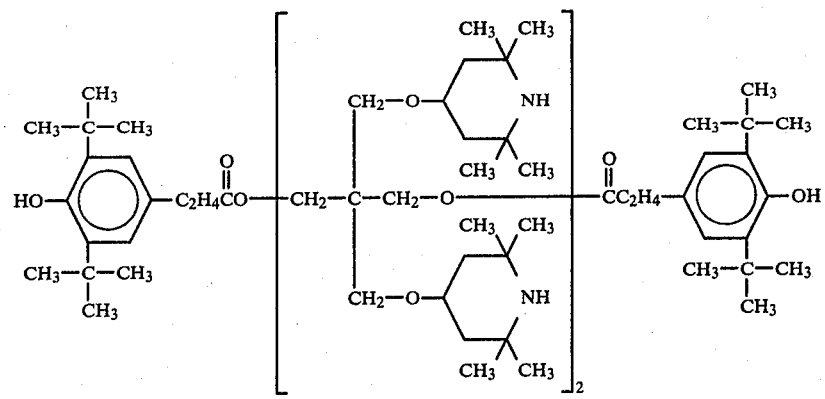
26.
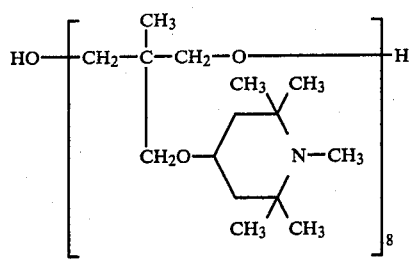
27.
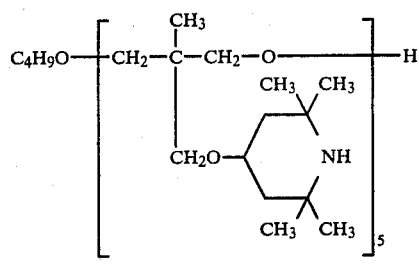
28.
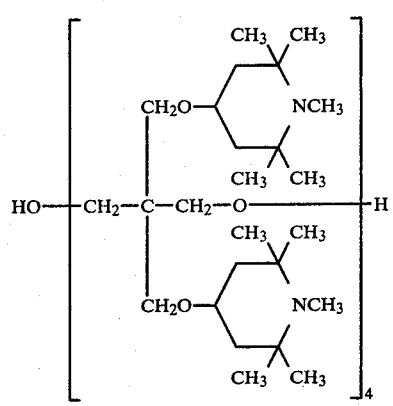

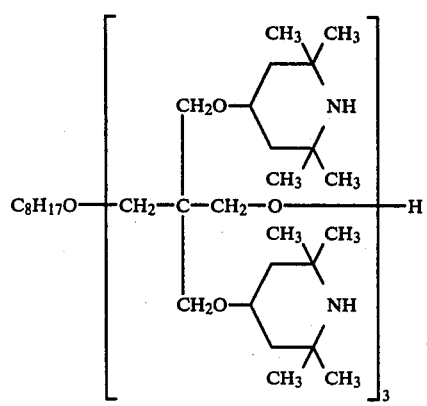
29.
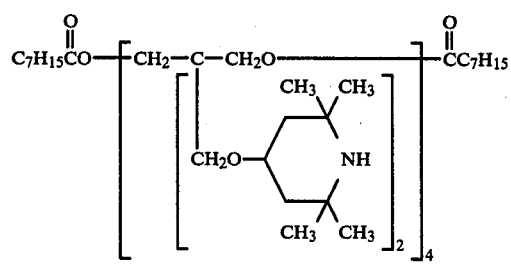
30.
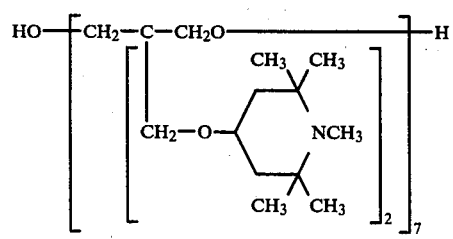
31.
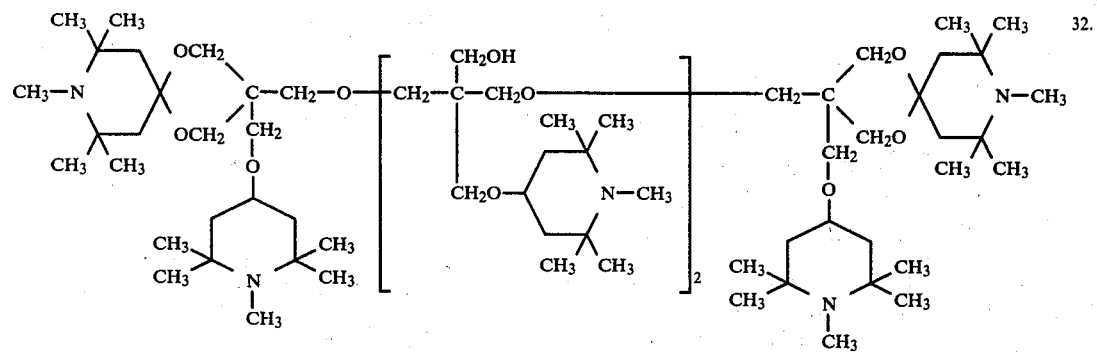
32.
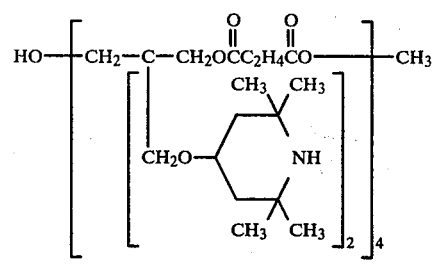
33.

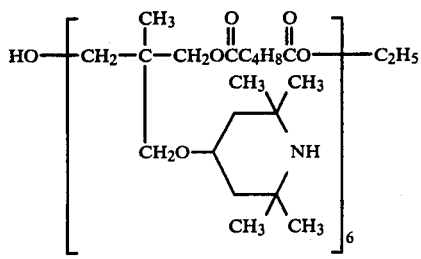

34.

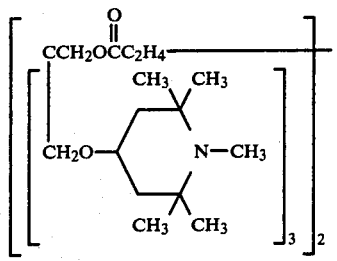

35.

The compounds of the invention can be prepared by the reaction of the 2,2,6,6-tetramethylpiperidyl alcohol $R_1$—OH with (poly)trimethylolalkane, (poly)pentaerythritol, or an alcohol containing an oxetane ring, to form the ether.

The etherification is carried out by the conventional method, for example, by the reaction of $R_1$—OH with the organic sulfonate of the above-mentioned alcohols, or by the reaction of $R_1$—OH with the halogenated above-mentioned alcohols in the presence of an alkali or acid acceptor.

The compounds where n is equal to 2 or more can be prepared by chain opening polymerization of the corresponding compound containing the oxetane ring.

The following Examples illustrate preferred embodiments of preparation of the compounds of the invention.

EXAMPLE I

Preparation of

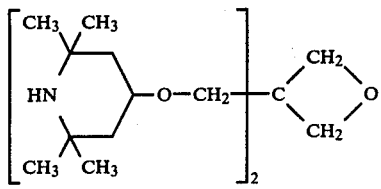

2,2,6,6-Tetramethyl-4-piperidinol 1.6 g, dimethyl formamide 10 ml and potassium-t-butoxide 1.8 g were heated and stirred at 80° C. for 30 minutes. Then, the solution of 2.8 g of 3,3-bis(benzenesulfonyloxymethyl)oxetane in 10 ml of dimethylformamide was added dropwise. After the addition, the solution was heated and stirred at 90° to 95° C. for 5 hours. The reaction mixture then was extracted with toluene.

The toluene extract was purified using column chromatography, and a pale yellow liquid was obtained, analyzing as follows: IR C=O—C 1090 cm$^{-1}$, C$_{n-h}$ 3300 cm$^{-1}$.

This shows the compound corresponded to the above formula.

EXAMPLE II

Preparation of

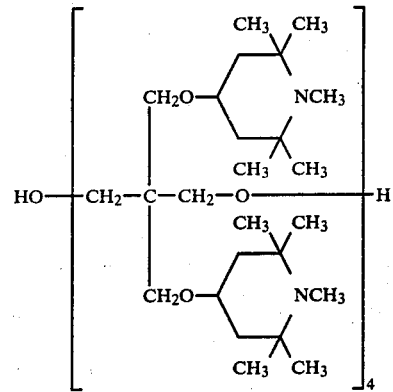

3,3-Bis(2,2,6,6-tetramethyl-4-piperidyloxy)oxetane prepared as in Example I was reacted with formic acid and formaldehyde to form 3,3-bis(1,2,2,6,6-pentamethyl-4-piperidyloxy)oxetane

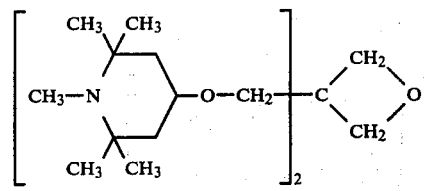

This

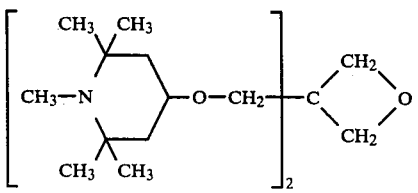

0.6 g was dissolved in 5 ml of tetrachloroethylene and cooled to 0°–5° C., and then 0.5 ml of BF$_3$-etherate was added. The solution was stirred at 20° to 25° C. for 24 hours, and then washed with aqueous potassium carbonate. The solvent was distilled off, and a product of softening point 50° to 60° C., M. W. 1600, was obtained.

Small amounts of the stabilizer of this invention when combined with synthetic resin improve the light stability of the resin. The amount of the stabilizer is generally within the range from about 0.001 to about 10 parts by weight, preferably from about 0.01 to about 3 parts by weight, per 100 parts by weight of resin.

Synthetic resins that can have their resistance to deterioration enhanced with the polymeric stabilizer compound according to this invention include α-olefin polymers such as polyethylene, polypropylene, polybutene, poly-3-methylbutene, or mixtures thereof, and copolymers with other monomers such as ethylene-vinyl acetate copolymer; ethylene-propylene copolymer; polystyrene; polyvinyl acetate; polyacrylic esters, copolymers from styrene and another monomer (for example, maleic anhydride, butadiene, and acrylonitrile); acrylonitrile-butadiene-styrene copolymer, acrylic acid ester-butadiene-styrene copolymer, methacrylic acid ester-butadiene-styrene copolymer, polymethacrylate esters such as polymethacrylate; polyvinyl alcohol; polyvinyl formal; polyvinyl butyral; linear polyesters, polyamides; polycarbonates; polyacetals; polyurethanes; cellulosic resins; phenol-formaldehyde resins; urea-formaldehyde resins; melamine-formaldehyde resins; epoxy resins; unsaturated polyester resins; silicone resins; halogen-containing resins such as polyvinyl chloride, polyvinylidene chloride, polyvinylidene fluoride, and copolymers thereof, and rubbers such as isoprene rubber, butadiene rubber, epichlorohydrin rubber, chloroprene rubber, and blends of any of the above.

The 2,2,6,6-tetraalkyl piperidyl ether stabilizers of the invention can be combined with conventional heat stabilizers such as phenolic antioxidants, polyvalent metal salts of organic acids, organic phosphites, thioethers, and other known heat stabilizers, thereby constituting light and heat stabilizer compositions of the invention.

The phenolic antioxidant contains one or more phenolic hydroxyl groups, and one or more phenolic nuclei, and can contain from about eight to about three hundred carbon atoms. In addition, the phenolic nucleus can contain an oxy or thio ether group.

The alkyl-substituted phenols and polynuclear phenols, because of their molecular weight, have a higher boiling point, and therefore are preferred because of their lower volatility. There can be one or a plurality of alkyl groups of one or more carbon atoms. The alkyl group or groups including any alkylene groups between phenol nuclei preferably aggregate at least four carbon atoms. The longer the alkyl or alkylene chain, the better the compatibility with polypropylene, inasmuch as the phenolic compound then acquires more of an aliphatic hydrocarbon character, and therefore there is no upper limit on the number of alkyl carbon atoms. Usually, from the standpoint of availability, the compound will not have more than about eighteen carbon atoms in an alkyl, alicyclidene and alkylene group, and a total of not over about fifty carbon atoms. The compounds may have from one to four alkyl radicals per phenol nucleus.

The phenol contains at least one and preferably at least two phenolic hydroxyls, the two or more hydroxyls being in the same ring, if there is only one. In the case of bicyclic phenols, the rings can be linked by thio or oxyether groups, or by alkylene, alicyclidene or arylidene groups.

The monocyclic phenols which can be employed have the structure:

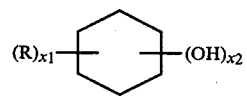

R is selected from the group consisting of hydrogen; halogen; and organic radicals containing from one to about thirty carbon atoms, such as alkyl, aryl, alkenyl, alkaryl, aralkyl, cycloalkenyl, cycloalkyl, alkoxy, and acyl

where R' is aryl, alkyl or cycloalkyl.

$x_1$ and $x_2$ are integers from one to four, and the sum of $x_1$ and $x_2$ does not exceed six.

The polycyclic phenol phenol is one having at least two aromatic nuclei linked by a polyvalent linking radical, as defined by the formula:

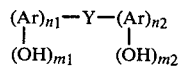

wherein Y is a polyvalent linking group selected from the group consisting of oxygen; carbonyl; sulfur; sulfinyl; aromatic, aliphatic and cycloaliphatic hydrocarbon groups; and oxyhydrocarbon, thiohydrocarbon and heterocyclic groups. The linking group can have from one up to twenty carbon atoms.

Ar is a phenolic nucleus which can be a phenyl or a polycarbocyclic group having condensed or separate phenyl rings; each Ar group contains at least one free phenolic hydroxyl group up to a total of five. The Ar rings can also include additional rings connected by additional linking nuclei of the type Y, for example, Ar-Y-Ar-Y-Ar.

$m_1$ and $m_2$ are numbers from one to five, and $n_1$ and $n_2$ are numbers of one or greater, and preferably from one to four.

The aromatic nucleus Ar can, in addition to phenolic hydroxyl groups, include one or more inert substituents. Examples of such inert substituents include hydrogen, halogen atoms, e.g., chlorine, bromine and fluorine; organic radicals containing from one to about thirty carbon atoms, such as alkyl, aryl, alkaryl, aralkyl, cycloalkenyl, cycloalkyl, alkoxy, aryloxy and acyloxy

where R' is aryl, alkyl or cycloalkyl, or thiohydrocarbon groups having from one to about thirty carbon atoms, and carboxyl

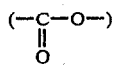

groups. Usually, however, each aromatic nucleus will not have more than about eighteen carbon atoms in any hydrocarbon substituent group. The Ar group can have from one to four substituent groups per nucleus.

Typical aromatic nuclei include phenyl, naphthyl, phenanthryl, triphenylenyl, anthracenyl, pyrenyl, chrysenyl, and fluoroenyl groups.

When Ar is a benzene nucleus, the polyhydric polycyclic phenol has the structure:

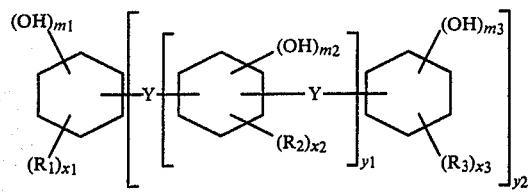

wherein $R_1$, $R_2$ and $R_3$ are inert substituent groups as described in the previous paragraph;

$m_1$ and $m_3$ are integers from one to a maximum of five;

$m_2$ is an integer from one to a maximum of four;

$x_1$ and $x_3$ are integers from zero to four, and $x_2$ is an integer from zero to three;

$y_1$ is an integer from zero to about six and $y_2$ is an integer from one to five, preferably one or two.

Preferably, the hydroxyl groups are located ortho and/or para to Y.

Exemplary Y groups are alkylene, alkylidene, and alkenylene; arylene, alkyl arylene, arylalkylene; cycloalkylene, cycloalkylidene; and oxa- and thia-substituted such groups; tetrahydrofuranes, esters and triazino groups. The Y groups are usually bi, tri, or tetravalent, connecting two, three or four Ar groups. However, higher valency Y groups connecting more than four Ar groups, can also be used. According to their constitution, the Y groups can be assigned to subgenera as follows:

(1) Y groups where at least one carbon in a chain or cyclic arrangement connect the aromatic groups, such as:

—CH$_2$—CH$_2$—; —(CH$_2$)$_5$—; —CH$_2$—;

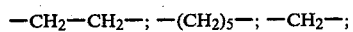

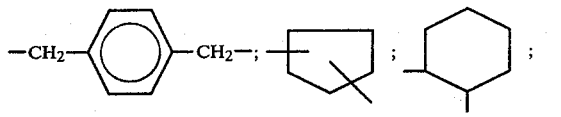

-continued

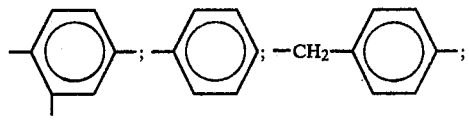

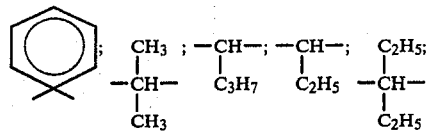

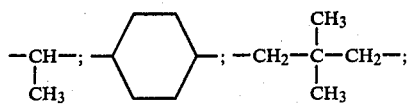

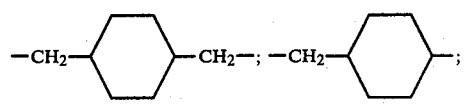

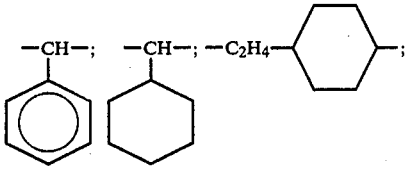

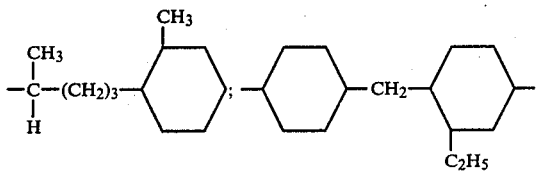

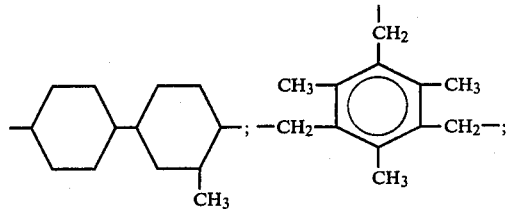

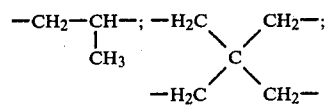

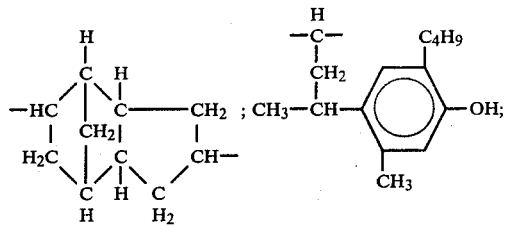

(2) Y groups where only atoms other than carbon link the aromatic rings, such as —O—, —S—,

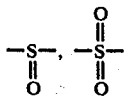

and —$(S)_x$— where x is a number from one to ten;

(3) Y groups made up of more than a single atom including both carbon and other atoms linking the aromatic nuclei, such as:

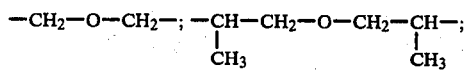

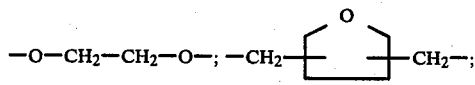

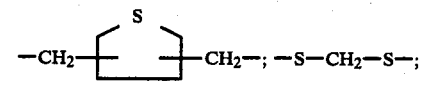

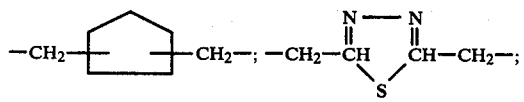

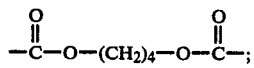

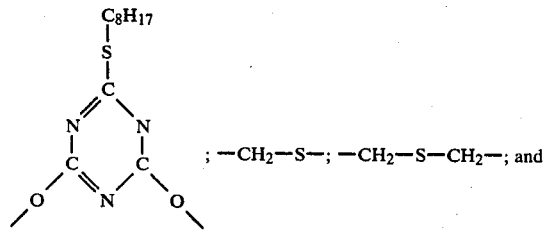

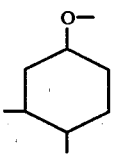

Although the relation of effectiveness to chemical structure is insufficiently understood, many of the most effective phenols have Y groups of subgenus (1), and accordingly this is preferred. Some of these phenols can be prepared by the alkylation of phenols or alkyl phenols with polyunsaturated hydrocarbons such as dicyclopentadiene or butadiene.

Representative phenols include guaiacol, resorcinol monoacetate, vanillin, butyl salicylate, 2,6-di-tert-butyl-4-methyl phenol, 2-tert-butyl-4-methoxy phenol, 2,4-dinonyl phenol, 2,3,4,5-tetradecyl phenol, tetrahydro-α-naphthol, o-, m- and p-cresol, o-, m- and p-phenylphenol, o-, m- and p-xylenols, the carvenols, symmetrical xylenol, thymol, o-, m- and p-nonylphenol, o-, m- and p-dodecyl-phenol, and o-, m- and p-octyl-phenol, o-, and m-tert-butyl-p-hydroxy-anisole, p-n-decyloxyphenol, p-n-decyloxy-cresol, nonyl-n-decyloxy-cresol, eugenol, isoeugenol, glyceryl monosalicylate, methyl-p-hydroxy-cinnamate, 4-benzyloxy-phenol, p-acetylaminophenol, p-stearyl-aminophenol, methyl-p-hydroxybenzoate, p-dichlorobenzoyl-aminophenol, p-hydroxysalicyl anilide, stearyl-(3,5-di-methyl-4-hydroxy-benzyl)thioglycolate, stearyl-β-(4-hydroxy-3,5-di-t-butylphenyl)propionate, distearyl-3,5-di-t-butyl-4-hydroxybenzylphosphonate, and distearyl (4-hydroxy-3-methyl-5-t-butyl)benzylmalonate.

Exemplary polyhydric phenols are orcinol, propyl gallate, catechol, resorcinol, 4-octyl-resorcinol, 4-dodecyl-resorcinol, 4-octadecyl-catechol, 4-isooctyl-phloroglucinol, pyrogallol, hexahydroxybenzene, 4-isohexyl-catechol, 2,6-di-tertiary-butyl-resorcinol, 2,6-di-isopropyl-phloroglucinol.

Exemplary polyhydric polycyclic phenols are methylene bis-(2,6-di-tertiary-butyl-phenol), 2,2-bis-(4-hydroxy-phenyl)propane, methylene-bis-(p-cresol), 4,4'-benzylidene bis (2-tertiary-butyl-5-methyl-phenol), 4,4'-cyclo-hexylidene bis-(2-tertiary-butylphenol), 2,2'-methylene-bis-(4-methyl-6-(1'-methyl-cyclohexyl)-phenol), 2,6-bis-(2'-hydroxy-3'-tertiary-butyl-5'-methyl-benzyl)-4-methylphenol, 4,4'-bis-(2-tertiary-butyl-5-methyl-phenol), 2,2'-bis-(4-hydroxy-phenyl)butane, ethylene bis-(p-cresol), 4,4'-oxobis-phenol, 4,4'-oxobis-(3-methyl-5-isopropyl-phenol), 4,4'-oxobis-(3-methyl-phenol), 2,2'-oxobis-(4-dodecyl-phenol), 2,2'-oxobis-(4-methyl-5-tertiary-butyl-phenol), 4,4'-thio-bis-phenol; 4,4'-thio-bis-(3-methyl-6-tertiary-butyl-phenol), 2,2'-thio-bis-(4-methyl-6-tertiary-butyl-phenol), 4,4'-n-butylidene-(2-t-butyl-5-methyl-phenol), 2,2'-methylene-bis-(4-methyl-6-(1'-methyl-cyclohexyl)-phenol), 4,4'-cyclohexylene bis-(2-tertiary-butyl-phenol), 2,6-bis-(2'-hydroxy-3'-t-butyl-5'-methyl-benzyl)-4-methyl-phenol, 4,4'-oxobis(naphthalene-1,5-diol), 1,3'-bis-(naphthalene-2,5-diol)propane, and 2,2'-butylene bis-(naphthalene-2,7-diol), (3-methyl-5-tert-butyl-4-hydroxyphenyl)-4'-hydroxy-phenyl)propane, 2,2'-methylene-bis-(4-methyl-5-isopropylphenol), 2,2'-methylene-bis-(4-methyl-5-isopropylphenol), 2,2'-methylene-bis-(5-tert-butyl-4-chlorophenol), (3,5-di-tert-butyl-4-hydroxyphenyl)-(4'-hydroxyphenyl)ethane, (2-hydroxy-phenyl)-(3',5'-di-tert-butyl-4',4-hydroxyphenyl)ethane, 2,2'-methylene-bis-(4-octylphenol), 4,4'-propylene-bis-(2-tert-butylphenol), 2,2'-isobutylene-bis-(4-nonylphenol), 2,4-bis-(4-hydroxy-3-t-butyl-phenoxy)-6-(n-octylthio)-1,3,5-triazine, 2,4,6-tris-(4-hydroxy-3-t-butyl-phenoxy)-1,3,5-triazine, 2,2'-bis-(3-t-butyl-4-hydroxyphenyl)thiazolo-(5,4-d)thiazole, 2,2'-bis-(3-methyl-5-t-butyl-4-hydroxyphenyl)thiazolo-(5,4-d)-thiazole, 4,4'-bis-(4-hydroxyphenyl)pentanoic acid octadecyl ester, cyclopentylene-4,4'-bis-phenol, 2-ethylbutylene-4,4'-bisphenol, 4,4'-cyclooctylene-bis-(2-cyclohexylphenol), β, β-thiodiethanol-bis-(3-tert-butyl-4-hydroxyphenoxy acetate), 1,4-butanedio-bis-(3-tert-butyl-4-hydroxyphenoxy acetate), pentaerythritol tetra-(4-hydroxyphenol propionate), 2,4,4'-tri-hydroxy benzophenone, bis-(2-tert-butyl-3-hydroxy-5-methylphenyl)sulfide, bis-(2-tert-butyl-4-hydroxy-5-methylphenyl)sulfide, bis-(2-tert-butyl-4-hydroxy-5-methoxyphenyl)sulfoxide, bis-(3-ethyl-5-tert-butyl-4-hydroxybenzyl)sulfide, bis-(2-hydroxy-4-methyl-6-tert-butyl-phenyl)sulfide, 4,4'-bis-(4-hydroxyphenol)pentanoic acid octadecyl thiopropionate ester, 1,1,3-tris-(2'-methyl-4-hydroxy-5'-tert-butylphenyl)butane, 1,1,3-tris-(1-methyl-3-hydroxy-4- tert-butylphenyl)butane, 1,8-bis-(2-hydroxy-5-methyl-benzoyl-n-octane, 2,2'-ethylene-bis-[4'-(3-tert-butyl-4-hydroxyphenyl)-thiazole], 1-methyl-3-(3-methyl-5-tert-butyl-4-hydroxybenzyl)-naphthalene, 2,2'-(2-butene)-bis-(4-methoxy-6-tert-butylphenol)-bis-[3,3-bis-(4-hydroxy-3-t-butylphenyl)butyric acid]glycol ester, 4,4'-butylidene-bis-(6-t-butyl-m-cresol), 1,1,3-tris-(2-methyl-4-hydroxy-5-t-butylphenyl)butane, 1,3,5-tris-(3,5-di-t-butyl-4-hydroxybenzyl)-2,4,6-trimethylbenzene, tetrakis[methylene-3-(3,5-di-t-butyl-4-hydroxyphenyl)propionate]methane, 1,3,5-tris-(3,5-di-t-butyl-4-hydroxybenzyl)isocyanurate, 1,3,5-tris-(3,5-di-t-butyl-4-hydroxyphenyl)propionyl-oxyethyl isocyanurate, 2-octylthio-4,6-di-(4-hydroxy-3,5-di-t-butyl)phenoxy-1,3,5-triazine, 4,4'-thiobis-(6-t-butyl-m-cresol) and pentaerythritol hydroxyphenyl propionate.

A particularly desirable class of polyhydric polycyclic phenols are the dicyclopentadiene polyphenols, which are of the type:

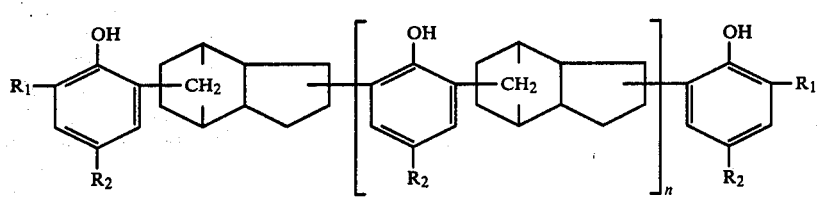

in which
R$_1$ and R$_2$ are lower alkyl, and can be the same or different, and
n is the number of the groups enclosed by the brackets, and is usually from 1 to about 5. These are described in U.S. Pat. No. 3,567,683, dated Mar. 2, 1971 to Spacht. A commercially available member of this class is Wingstay L, exemplified by dicyclopentadiene tri-(2-tert-butyl-4-methyl-phenol) of the formula:

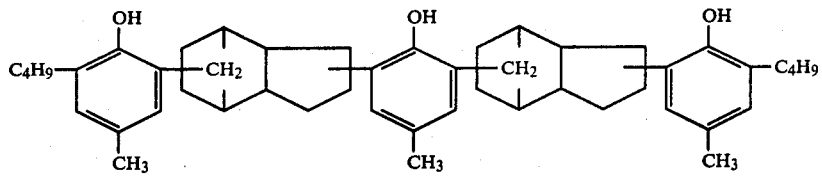

The polyhydric polycyclic phenols used in the invention can also be condensation products of phenols or alkylphenols with hydrocarbons having a bicyclic ring structure and a double bond or two or more double bonds, such as α-pinene, β-pinene, dipentene, limonene, vinylcyclohexene, dicyclopentadiene, allo-ocimene, isoprene and butadiene. These condensation products are usually obtained under acidic conditions in the form of more or less complex mixtures of monomeric and polymeric compounds. However, it is usually not necessary to isolate the individual constituents. The entire reaction product, merely freed from the acidic condensation catalyst and unchanged starting material, can be used with excellent results. While the exact structure of these phenolic condensation products is uncertain, the Y groups linking the phenolic nuclei all fall into the preferred subgenus 1. For method of preparation, see e.g., U.S. Pat. No. 3,124,555, U.S. Pat. No. 3,242,135, and British Pat. No. 961,504.

When the stabilizer composition is used in conjunction with a polyvalent metal salt of an organic acid, the organic acid will ordinarily have from about six to about twenty-four carbon atoms. The polyvalent metal can be any metal of Group II of the Periodic Table, such as zinc, calcium, cadmium, barium, magnesium and strontium. The alkali metal salts and heavy metal salts such as lead salts are unsatisfactory. The acid can be any organic non-nitrogenous monocarboxylic acid having from six to twenty-four carbon atoms. The aliphatic, aromatic, alicyclic and oxygen-containing heterocyclic organic acids are operable as a class. By the term "aliphatic acid" is meant any open chain carboxylic acid, substituted, if desired, with nonreactive groups, such as halogen, sulfur and hydroxyl. By the term "alicyclic" it will be understood that there is intended any cyclic acid in which the ring is nonaromatic and composed solely of carbon atoms, and such acids may if desired have inert, nonreactive substituents such as halogen, hydroxyl, alkyl radicals, alkenyl radicals and other carbocyclic ring structures condensed therewith. The oxygen-containing heterocyclic compounds can be aromatic or nonaromatic and can include oxygen and carbon in the ring structure, such as alkyl-substituted furoic acid. The aromatic acids likewise can have nonreactive ring substituents such as halogen, alkyl and alkenyl groups, and other saturated or aromatic rings condensed therewith.

As exemplary of the acids which can be used in the form of their metal salts there can be mentioned the following: hexoic acid, 2-ethylhexoic acid, n-octoic acid, isooctoic acid, capric acid, undecylic acid, lauric acid, myristic acid, palmitic acid, margaric acid, stearic acid, oleic acid, ricinoleic acid, behenic acid, chlorocaproic acid, hydroxy capric acid, benzoic acid, phenylacetic acid, butyl benzoic acid, ethyl benzoic acid, propyl benzoic acid, hexyl benzoic acid, salicylic acid, naphthoic acid, 1-naphthalene acetic acid, orthobenzoyl benzoic acid, naphthenic acids derived from petroleum, abietic acid, dihydroabietic acid, hexahydrobenzoic acid, and methyl furoic acid.

The water-insoluble salts are preferred, because they are not leached out when the plastic is in contact with water. Where these salts are not known, they are made by the usual types of reactions, such as by mixing the acid, or anhydride with the corresponding oxide or hydroxide of the metal in a liquid solvent, and heating, if necessary, until salt formation is complete.

A variety of organic triphosphites and acid phosphites can be employed, of which the following are exemplary.

The organic triphosphite can be any organic phosphite having three or more organic radicals attached to phosphorus through oxygen. The acid phosphite can be any organic phosphite having one or two organic radicals attached to phosphorus through oxygen. These radicals can be monovalent radicals, in the case of the triphosphites, diphosphites and monophosphites.

The organic triphosphites in which the radicals are monovalent radicals can be defined by the formula:

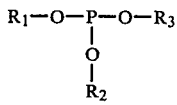

in which $R_1$, $R_2$ and $R_3$ are selected from the group consisting of alkyl, alkenyl, aryl, alkaryl, aralkyl, and cycloalkyl groups having from one to about thirty carbon atoms.

The acid phosphites are defined by the same formula, but one or two of $R_1$, $R_2$ and $R_3$ is hydrogen or a cation of a metal or ammonium.

Also included are the organic triphosphites having a bivalent organic radical forming a heterocyclic ring with the phosphorus of the type:

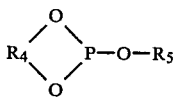

in which $R_4$ is a bivalent organic radical selected from the group consisting of alkylene, arylene, aralkylene, alkarylene and cycloalkylene radicals having from two to about thirty carbon atoms, and $R_5$ is a monovalent organic radical as defined above in the case of $R_1$, $R_2$ and $R_3$;

$R_5$ is hydrogen or a cation, in the case of the acid phosphites.

Also useful organic triphosphites are mixed heterocyclic-open chain phosphites of the type:

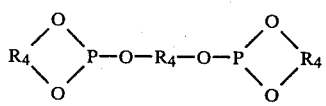

More complex triphosphites are formed from trivalent organic radicals, of the type:

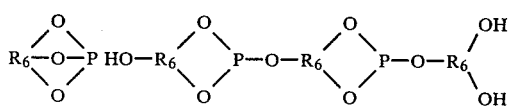

in which $R_6$ is a trivalent organic radical of any of the types of $R_1$ to $R_5$, inclusive, as defined above.

A particularly useful class of complex triphosphites are the tetraoxadiphosphaspiro undecanes of the formula:

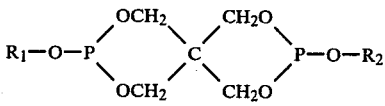

where $R_1$ and $R_2$ are selected from the group consisting of aryl, alkyl, aryloxyethyl, alkyloxyethyl, aryloxyethoxyethyl, alkyloxyethoxyethyl and alkyloxypolyethoxyethyl having from about 1 to about 30 carbon atoms.

In the case of the acid phosphites, one or both of $R_1$ and $R_2$ is also hydrogen or a cation.

An especially preferred class of organic triphosphites and acid phosphites have a bicyclic aromatic group attached to phosphorus through oxygen, with no or one or more phenolic hydroxyl groups on either or both of the aromatic rings. These phosphites are characterized by the formula:

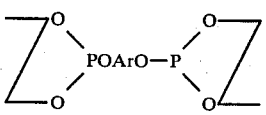

or

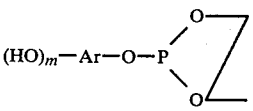

in which

Ar is a mono or bicyclic aromatic nucleus and m is an integer of from 0 to about 5. Z is one or a plurality of organic radicals as defined above for $R_1$ to $R_6$, taken singly or together in sufficient number to satisfy the valences of the two phosphite oxygen atoms.

One or both Z radicals is also hydrogen, in the case of the acid phosphites, and can include additional bicyclic aromatic groups of the type $(HO)_m$—Ar.

The cation in the case of acid phosphites can be a metal, such as an alkali metal, for instance, sodium, potassium or lithium; an alkaline earth metal, for instance, barium, calcium, or a nontoxic polyvalent metal, such as magnesium, tin and zinc.

Usually, the triphosphites and acid phosphites will not have more than about sixty carbon atoms.

Exemplary triphosphites are monophenyl di-2-ethylhexyl phosphite, diphenyl mono-2-ethylhexyl phosphite, di-isooctyl monotolyl phosphite, tri-2-ethylhexyl phosphite, phenyl dicyclohexyl phosphite, phenyl diethyl phosphite, triphenyl phosphite, tricresyl phosphite, tri(dimethylphenyl)phosphite, trioctadecyl phosphite, triisooctyl phosphite, tridodecyl phosphite, isooctyl diphenyl phosphite, diisooctyl phenyl phosphite, tri(t-octylphenyl)phosphite, tri-(t-nonylphenyl)phosphite, benzyl methyl isopropyl phosphite, butyl dicresyl phosphite, isooctyl di(octylphenyl)phosphite, di(2-ethylhexyl)(isooctylphenyl)phosphite, tri(2-cyclohexylphenyl)phosphite), tri-α-naphthyl phosphite, tri(-phenylphenyl)phosphite, tri(2-phenylethyl)phosphite, ethylene phenyl phosphite, ethylene t-butyl phosphite, ethylene isohexyl phosphite, ethylene isooctyl phosphite, ethylene cyclohexyl phosphite, 2-phenoxy-1,3,2-dioxaphosphorinane, 2-butoxy-1,3,2-dioxyphosphorinane, 2-octoxy-5,5-dimethyl-dioxaphosphorinane, and 2-cyclohexyloxy-5,5-diethyl dioxaphosphorinane.

Exemplary pentaerythritol triphosphites are 3,9-diphenoxy-2,4,8,10-tetraoxa-3,9-diphosphaspiro-(5,5)-undecane (diphenyl-pentaerythritol diphosphite), 3,9-di(decyloxy)-2,4,8,10-tetraoxa-3,9-diphosphaspiro(5,5)-undecane, 3,9-di(isodecyloxy)-2,4,8,10-tetraoxa-3,9-diphosphaspiro-(5,5)-undecane, 3,9-di(octadecyloxy)-2,4,8,10-tetraoxa-3,9-diphosphaspiro-(5,5)-undecane, 3-phenoxy-9-isodecyloxy-2,4,8,10-tetraoxa-3,9-diphosphaspiro-(5,5)-undecane, 3,9-di(methoxy)-2,4,8,10-tetraoxa-3,9-diphosphaspiro-(5,5)-undecane, 3,9-di(lauryloxy)-2,4,8,10-tetraoxa-3,9-diphosphaspiro-(5,5)-undecane, 3,9-di-p-tolyloxy-2,4,8,10-tetraoxa-3,9-diphosphaspiro-(5,5)-undecane, 3,9-di(methoxyethyloxy)-2,4,8,10-tetraoxa-3,9-diphosphaspiro-(5,5)-undecane, 3-methoxyethyloxy-9-isodecyloxy-2,4,8,10-tetraxoa-3,9-diphosphaspiro-(5,5)-undecane, 3,9-di(ethoxyethyloxy)-2,4,8,10-tetraoxa-3,9-diphosphaspiro-(5,5)-undecane, 3,9-di(butoxyethoxy)-2,4,8,10-tetraoxa-3,9-diphosphaspiro-(5,5)-undecane, 3-methoxyethyloxy-9-butoxy-ethyloxy-2,4,8,10-tetraoxa-3,9-diphosphaspiro-(5,5)-undecane, 3,9-di(methoxyethoxyethyloxy)-2,4,8,10-tetraoxa-3,9-diphosphaspiro-(5,5)-undecane, 3,9-di(butoxyethoxyethyloxy)-2,4,8,10-tetraoxa-3,9-diphosphaspiro-(5,5)-undecane, 3,9-di(methoxyethoxyethoxyethyloxy)-2,4,8,10-tetraoxa-3,9-diphosphaspiro-(5,5)-undecane, 3,9-di(methoxy(polyethoxy)ethyloxy)-2,4,8,10-tetraoxa-3,9-diphosphaspiro-(5,5)-undecane where the (polyethoxy)ethyloxy group has an average molecular weight of 350),3,9-di(methoxy(polyethoxy)ethyloxy)-2,4,8,10-tetraoxa-3,9-diphosphaspiro-(5,5)-undecane (where the (polyethoxy)ethyloxy group has an average molecular weight of 550).

Exemplary of the bis aryl triphosphites are: bis(4,4'-thio-bis(2-tertiary-butyl-5-methyl-phenol))isooctyl phosphite, mono(4,4'-thio-bis(2-tertiary-butyl-5-methyl-phenol))di-phenyl phosphite, tri-(4,4'-n-butylidene-bis(2-tertiary-butyl-5-methylphenol))phosphite, (4,4'-benzylidene-bis(2-tertiary-butyl-5-methyl-phenol))diphenyl phosphite, isooctyl 2,2'-bis(-parahydroxyphenyl)propane phosphite, decyl 4,4'-n-butylidene-bis(2-tertiary-butyl-5-methylphenol)phosphite, tri-4,4'-thio-bis(2-tertiary-butyl-5-methylphenol)phosphite, 2-ethylhexyl-2,2'-methylene-bis(4-methyl-6,1'-methylcyclohexyl)phenol phosphite, tri(2,2'-bis-(para-hydroxyphenyl)propane)phosphite, tri(4,4'-thio-bis(2-tertiary-butyl-5-methyl-phenol)phosphite, isooctyl(2,6-bis(2'-hydroxy-3,5-dinonylbenzyl)-4-nonyl phenyl))phosphite, tetra-tridecyl-4,4'-n-butylidene-bis(2-tertiary-butyl-5-methylphenyl)diphosphite, tetra-isooctyl-4,4'-thio-bis(2-tertiary-butyl-5-methylphenyl)diphosphite, 2,2'-methylene-bis(4-methyl-6,1'-methyl cyclohexyl phenyl)polyphosphite, isooctyl-4,4'-isopropylidene-bisphenyl polyphosphite, 2-ethylhexyl-2,2'-methylene-bis(4-methyl-6,1'-methyl-cyclohexyl)phenyl triphosphite, tetra-tridecyl-4,4'-oxydiphenyl diphosphite, tetra-n-dodecyl-4,4'-n-butylidene bis(2-tertiary-butyl-5-methylphenyl)diphosphite, tetra-tridecyl-4,4'-isopropylidene bisphenyl diphosphite, hexa-tridecyl butane-1,1,3-tris(2'-methyl-5'-tertiary-butylphenyl-4')triphosphite.

Exemplary acid phosphites are di(phenyl)phosphite, monophenyl phosphite, mono(diphenyl)phosphite, dicresyl phosphite, di-(o-isooctylphenyl)phosphite, di(p-ethylhexylphenyl)phosphite, di(p-t-octylphenyl)-phosphite, di(methylphenyl)phosphite, di-n-butyl phosphite, di-2ethylhexyl phosphite, mono-2-ethylhexyl-phosphite, diisooctyl phosphite, monoisooctyl phosphite, monododecyl phosphite, 2-ethylhexyl phenyl phosphite, 2-ethylhexyl-(n-octylphenyl)phosphite, monocyclohexyl phosphite, dicyclohexyl phosphite, di(2-cyclohexyl phenyl)phosphite, di-α-naphthyl phosphite, diphenyl phenyl phosphite, di(diphenyl)phosphite, di-(2-phenyl ethyl)phosphite, dibenzyl phosphite, monobenzyl phosphite, n-butyl cresyl phosphite and didodecyl phosphite, cresyl phosphite, t-octylphenyl phosphite, ethylene phosphite, butyl cresyl phosphite, isooctyl monotolyl phosphite and phenyl cyclohexyl phosphite.

Exemplary of the bis aryl acid phosphites are: bis(4,4'-thio-bis(2-tertiary-butyl-5-methylphenol))-phosphite, (4,4'-thio-bis(2-tertiary-butyl-5-methylphenol))phenyl phosphite, bis(4,4'-n-butylidene-bis(2-tertiary-butyl-5-methylphenol))phosphite, mono(4,4'-benzylidene-bis(2-tertiary-butyl-5-methylphenol))-phosphite, mono(2,2'-bis-(parahydroxyphenyl)-propane)phosphite, mono(4,4'-butylidene-bis(2-tertiary-butyl-5-methylphenol)phosphite, bis(4,4'-thio-bis(2-tertiary-butyl-5-methylphenol))phosphite, mono-2-ethylhexyl-mono-2,2'-methylene-bis(4-methyl-6,1-methylcyclohexyl)phenol phosphite, bis(2,2'-bis(para-hydroxyphenyl)propane)phosphite, monoisooctylmono(4,4'-thio-bis(2-tertiary-butyl-5-methylphenol))phosphite, isooctyl-(2,6-bis(2'-hydroxy-3,5-dinonylbenzyl)-4-nonylphenyl))phosphite, tri-tridecyl-4,4'-n-butylidene-bis(2-tertiary-butyl-5-methylphenyl)diphosphite, triisooctyl-4,4'-thio-bis(2-tertiary-butyl-5-methylphenyl)-disphosphite, bis(2,2'-methylene-bis(4-methyl-6,1'-methyl cyclohexyl phenyl))phosphite, isooctyl-4,4'-isopropylidene-bis-phenyl phosphite, monophenyl mono(2,2'-methylene-bis(4-methyl-6,1'-methyl-cyclohexyl))triphosphite, di-tridecyl-4,4'-oxydiphenyl diphosphite, di-n-dodecyl-4,4'-n-butylidene-bis(2-tertiary-butyl-5-methylphenyl)diphosphite, di-tridecyl-4,4'-isopropylidene bisphenyl diphosphite, tetra-tridecyl butane-1,1,3-tris(2'-methyl-5-tertiary-butylphenyl-4)-triphosphite.

The thiodipropionic acid ester has the following formula:

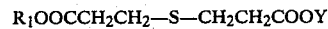

R₁OOCCH₂CH₂—S—CH₂CH₂COOY in which $R_1$ is an organic radical selected from the group consisting of hydrocarbon radicals such as alkyl, alkenyl, aryl, cycloalkyl and mixed alkyl aryl and mixed alkyl cycloalkyl radicals; hydroxyalkyl and hydroxyalkyloxyalkylene radicals; and esters thereof with aliphatic carboxylic acids; and Y is selected from the group consisting of (a) hydrogen, (b) a second R radical $R_2$, which can be the same as or different from the $R_1$ radical, (c) a polymeric chain of n thiodipropionic acid ester units:

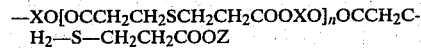

—XO[OCCH₂CH₂SCH₂CH₂COOXO]$_n$OCCH₂CH₂—S—CH₂CH₂COOZ where Z is hydrogen, $R_2$ or M, n is the number of thiodipropionic acid ester units in the chain, and X is a bivalent hydrocarbon group of the type of $R_1$, that is, alkylene, alkenylene, cycloalkylene, mixed alkylene-arylene and mixed alkylene-cycloalkylene radicals; hydroxyalkylene and hydroxyalkyloxyalkylene radicals; and esters thereof with aliphatic carboxylic acids; the value of n can range upwards from 0, but there is no upper limit on n except as is governed by the ratio of carbon atoms to sulfur atoms as stated below; and (d) a polyvalent metal M of Group II of the periodic table such as zinc, calcium, cadmium, barium, magnesium and strontium.

The molecular weights of the R and Y radicals are taken such that with the remainder of the molecule the thiodipropionic ester has a total of from about ten to about sixty carbon atoms per sulfur atom.

Accordingly, the various thiodipropionic acid ester species coming within the above-designated categories within the general formula can be defined as follows:

(a) $R_1OOCCH_2CH_2SCH_2CH_{COOH}$
(b) $R_1OOCCH_2CH_2SCH_2CH_2COOR_2$
(c) $R_1O[OCCH_2CH_2SCH_2CH_2COOX-O]_{n}OCCH_2CH_2SCH_2CH_2COOZ$
(d) $R_1OOCCH_2CH_2SCH_2CH_2COOM$

In the above formulae $R_1$ and $R_2$, M, X and Z are the same as before and the value of $n_1$ can range upwards from 1, but there is no upper limit on $n_1$ except as is imposed by the ratio of carbon atoms, as stated below. In the polymer (c), as in the other forms of thiodipropionic acid esters, the total number of carbon atoms per sulfur atom is within the range from about ten to about sixty.

The R radical of these esters is important in furnishing compatibility with the polymer. The Y radical is desirably a different radical, $R_2$ or M or a polymer, where R is rather low in molecular weight, so as to compensate for this in obtaining the optimum compatibility and nonvolatility. Where Y is a metal, the thiodipropionic acid ester furnishes the beneficial properties of the polyvalent metal salt which is described above.

The aryl, alkyl, alkenyl, and cycloalkyl groups may, if desired, contain inert, nonreactive substituents such as halogen and other carbocyclic and heterocyclic ring structures condensed therewith.

Typical R radicals are, for example, methyl, ethyl, propyl, isopropyl, butyl, isobutyl, t-butyl, amyl, isoamyl, n-octyl, isooctyl, 2-ethyl hexyl, t-octyl, decyl, dodecyl, octadecyl, allyl, hexenyl, linoleyl, ricinoleyl, oleyl, phenyl, xylyl, tolyl, ethylphenyl, nahthyl, cyclohexyl, benzyl, cyclopentyl, methylcyclohexyl, ethylcyclohexyl, and naphthenyl, hydroxyethyl, hydroxypropyl, glyceryl, sorbityl, pentaerythrityl, and polyoxyalkylene radicals such as those derived from diethylene glycol, triethylene glycol, polyoxypropylene glycol, polyoxyethylene glycol, and polyoxypropyleneoxyethylene glycol, and esters thereof with any of the organic acids named below in the discussion of the polyvalent metal salts, including in addition those organic acids having from two to five carbon atoms, such as acetic, propionic, butyric and valeric acids.

Typical X radicals are alkylene radicals such as ethylene, tetramethylene, hexamethylene, decamethylene, alkyl-substituted alkylene radicals such as 1,2-propylene,

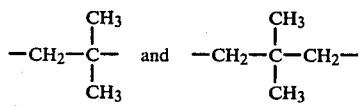

arylene radicals such as phenylene

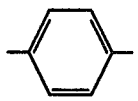

methylenephenylene

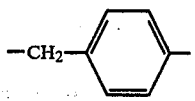

dimethylene phenylene

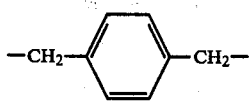

and alicyclylene such as cyclohexylene

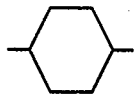

and cyclopentylene

As exemplary of the thiodipropionic acid esters which can be used, there can be mentioned the following: monolauryl thiodipropionic acid, dilauryl thiodipropionate, butyl stearyl thiodipropionate, 2-ethylhexyl lauryl thiodipropionate, di-2-ethylhexyl-thiodipropionate, diisodecyl thiodipropionate, isodecyl phenyl thiodipropionate, benzyl lauryl thiodipropionate, benzyl phenyl thiodipropionate, the diester of mixed coconut fatty alcohols and thiodipropionic acid, the diester of mixed tallow fatty alcohols and thiodipropionic acid, the acid ester of mixed cottonseed oil fatty alcohols and thiodipropionic acid, the acid ester of mixed soyabean oil fatty alcohols and thiodipropionic acid, cyclohexyl nonyl thiodipropionate, monooleyl thiodipropionic acid, hydroxyethyl lauryl thiodipropionate, monoglycerol thiodipropionic acid, glyceryl monostearate monothiodipropionate, sorbityl isodecyl thiodipropionate, the polyester of diethylene glycol and thiodipropionic acid, the polyester of triethylene glycol and thiodipropionic acid, the polyester of hexamethylene glycol and thiodipropionic acid, the polyester of pentaerythritol and thiodipropionic acid, the polyester of octamethylene glycol and thiodipropionic acid, the polyester of p-dibenzyl alcohol and thiodipropionic acid, ethylbenzyl lauryl thiodipropionate, strontium stearyl thiodipropionate, magnesium oleyl thiodipropionate, calcium dodecylbenzyl thiodipropionate, and mono(dodecylbenzyl)thiodipropionic acid.

These esters are for the most part known compounds, but where they are not available, they are readily prepared by esterification of thiodipropionic acid and the corresponding alcohol.

Also useful are:

(1) Thioalkanoic acid amides of Tokuno et al Japanese Pat. No. 16,286/68 having the formula:

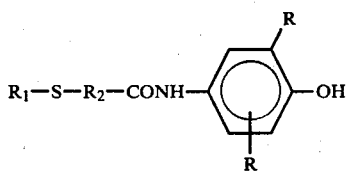

R is alkyl of one to eight carbon atoms, $R_1$ is alkyl of six to twenty-four carbon atoms, and $R_2$ is alkylene of one to six carbon atoms.

(2) Thioalkanoic acid amides of 1,3,5-triazines of Ozeki et al Japanese Pat. No. 20,366/68 having the formula:

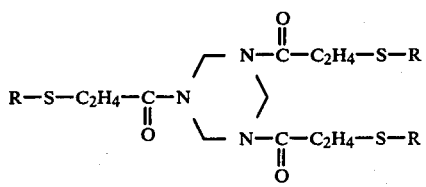

R is alkyl of eight to eighteen carbon atoms.

(3) Bis-thioalkanoic acid amides of Yamamoto et al Japanese Pat. No. 23,765/68 having the formula:

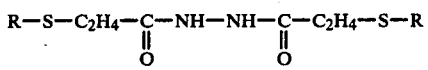

R is alkyl of more than six carbon atoms, aryl or aralkyl.

(4) Bis-thioalkylanoic acid amides of Ozeki et al Japanese Pat. No. 26,184/69 having the formula:

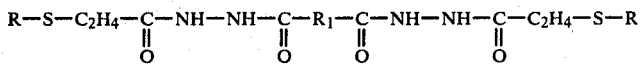

R is alkyl of twelve to eighteen carbon atoms, and $R_1$ is alkylene of one to ten carbon atoms, cycloalkylene, or arylene.

(5) Bis-alkylene thioalkanoic acid amides of Ozeki Japanese Pat. No. 31,464/69 having the formula:

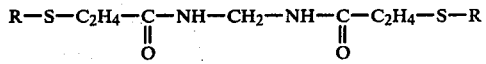

R is alkyl of more than six carbon atoms, aryl, or aralkyl.

(6) Thioalkanoic acid amide derivatives of Minagawa et al, published Japanese application No. 106,484/74 having the formula:

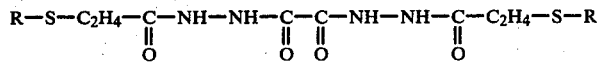

R is hydrocarbyl of one to twenty carbon atoms.

(7) Alkylene bis-thioalkanoic acid amides of U.S. Pat. No. 4,279,805 to Ohzeki et al, patented July 21, 1981, having the general formula:

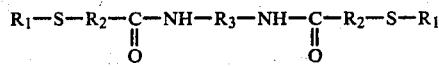

wherein:
$R_1$ is alkyl having from one to about fifty carbon atoms;
$R_2$ is alkylene having from one to about three carbon atoms; and
$R_3$ is alkylene having from about two to about twelve carbon atoms.

$\beta$-Alkylthiopropionic acid esters having the general formula:

wherein:
R is alkyl of four to twenty carbon atoms;
n is a number from 1 to 6; and
R' is the residue of an alcohol having from one to six hydroxyl groups.

Pentaerythritol tetra dodecyl thio propionate is an example of this group.

Other conventional light stabilizers can be employed, such as hydroxybenzophenones such as 2-hydroxy-4-methoxybenzophenone, 2-hydroxy-4-n-octoxy benzophenone, 2,4-dihydroxybenzophenone, benzotriazoles, such as 2(2-hydroxy-5-methylphenyl)benzotriazoles, 2(2-hydroxy-3-t-butyl-5-methylphenyl)-5-chlorobenzotriazole, 2(2-hydroxy-3-5-di-t-butylphenyl) 5-chlorobenzotriazole, 2(2-hydroxy-3,5-di-t-amylphenyl)-benzotriazole, benzoates such as phenylsalicylate, 2,4-di-t-butylphenyl-3,5-di-t-butyl-4-hydroxy phenylbenzoate, nickel compounds such as nickel-2,2'-thiobis(4-t-octyl-phenolate), nickel-monoethyl(3,5-di-t-butyl-4-hydroxybenzyl)phosphonate, substituted acrylonitriles such as methyl-$\alpha$-cyano-$\beta$-methyl-$\beta$-(p-methoxy phenyl)acrylate and oxalic anilides such as N-2-ethyl phenyl-N'-2-ethoxy-5-t-butyl phenyl oxalic diamide, N-2-ethyl phenyl-N'-2-ethoxy phenyl oxalic diamide.

A sufficient amount of the stabilizer or combination is used to improve the resistance of the synthetic polymer to deterioration in physical properties when exposed to heat and light, including, for example, discoloration, reduction in melt viscosity and embrittlement. Very small amounts are usually adequate. Amounts within the range from about 0.001 to about 10% total stabilizers including the polymeric light stabilizer of the invention by weight of the polymer are satisfactory. Preferably, from 0.01 to 5% is employed for optimum stabilization.

The stabilizer systems of the invention are readily rendered in solid particulate form, comprising a blend of:

(a) piperidyl ether light stabilizer in an amount of from about 10 to about 35 parts by weight; and optionally:

(b) a phenolic antioxidant in an amount from about 10 to about 35 parts by weight; and/or (c) other heat or light stabilizers in an amount of from about 10 to about 35 parts by weight.

The piperidyl ether light stabilizer of the invention can be employed in combination with phenolic antioxidant and/or other conventional heat and light stabilizers for the particular synthetic polymer.

Thus, for example, in the case of polyvinyl chloride resins, other polyvinyl chloride resin heat stabilizers can be included, including polyvalent metal fatty acid salts such as barium and cadmium salts of the higher fatty acids; organotin compounds; and epoxy compounds; and organic phosphites.

With polyolefin resins there can be employed fatty acid salts of polyvalent metals, and the higher fatty acid esters of thiodipropionic acids, such as, for example, dilauryl thiodipropionate.

With polyamide resin compositions, polyamide stabilizers such as copper salts in combination with iodides and/or other phosphorus compounds and salts of divalent manganese can be used.

With synthetic rubbers and acrylonitrile-butadiene-styrene terpolymers, other antioxidants and polyvalent metal salts of the higher fatty acids can be used.

In addition, other conventional additives for synthetic polymers, such as plasticizers, lubricants, emulsifiers, antistatic agents, flame-proofing agents, pigments and fillers, can be employed.

The stabilizer or combination is incorporated in the polymer in suitable mixing equipment, such as a mill or a Banbury mixer. If the polymer has a melt viscosity which is too high for the desired use, the polymer can be worked until its melt viscosity has been reduced to the desired range before addition of the stabilizer. Mixing is continued until the mixture is substantially uniform. The resulting composition is then removed from the mixing equipment and brought to the size and shape desired for marketing or use.

The stabilized polymer can be worked into the desired shape, such as by milling, calendering, extruding or injection molding or fiber-forming. In such operations, it will be found to have a considerably improved resistance to reduction in melt viscosity during the heating, as well as a better resistance to discoloration and embrittlement on ageing and heating.

The following Examples in the opinion of the inventors represent preferred embodiments of the invention:

EXAMPLES 1 TO 10

A group of polyvinyl chloride resin compositions was prepared, having the following formulation:

| Ingredient | Parts by Weight |
|---|---|
| Polyvinyl chloride | 100 |
| Dioctylphthalate | 48 |
| Epoxidized soybean oil | 2 |
| Tris(nonylphenyl)phosphite | 0.2 |
| Ca stearate | 1.0 |
| Zn stearate | 0.1 |
| Stabilizer as shown in Table I | 0.3 |

This formulation was blended and sheeted off on a two-roll mill to form sheets 1 mm thick. The light resistance of these sheets was then determined by placing strips 1 cm wide in a Weather-O-Meter, and exposing them to ultraviolet light. The time in hours was then noted for the sheets to develop a noticeable discoloration and/or embrittlement, indicating deterioration due to oxidation in the presence of ultraviolet light.

The following results were obtained:

TABLE I

| Example No. | Piperidyl Ether Stabilizer | Hours to Failure |
|---|---|---|
| Control 1 | None | 180 |
| Control 2 | 1,2-Bis(2,2,6,6-tetramethyl-4-piperidyloxy)ethane | 310 |
| Control 3 | 1,2-Bis(1,2,2,6,6-pentamethyl-4-piperidyloxy)ethane | 310 |
| Control 4 | N—Acetyl-2,2,6,6-tetramethyl-4-piperidyl glycidylether polymer (M.W.; 800) | 370 |
| Example 1 | [HN-piperidyl(2,2,6,6-tetramethyl)-O-CH$_2$-C(CH$_2$-O-CH$_2$) (oxetane)]$_2$ | 820 |
| Example 2 | [CH$_3$COC$_2$H$_4$-N-piperidyl(2,2,6,6-tetramethyl)-O-CH$_2$-C(CH$_2$-O-CH$_2$) (oxetane)]$_2$ | 760 |
| Example 3 | [CH$_2$(epoxide)CHCH$_2$-N-piperidyl(2,2,6,6-tetramethyl)-O-CH$_2$-C(CH$_2$-O-CH$_2$) (oxetane)]$_2$ | 830 |

TABLE I-continued

| Example No. | Piperidyl Ether Stabilizer | Hours to Failure |
|---|---|---|
| Example 4 | [structure: acetoxy-tetramethylpiperidine-N-C₂H₄-O-CH₂-C(CH₂-O-CH₂) ]₂ | 720 |
| Example 5 | [structure with neopentyl dioxy group, tetramethylpiperidine-N-C₂H₄-O-CH₂-C(CH₂-O-CH₂) ]₂ | 730 |
| Example 6 | [CH₃-N(tetramethylpiperidine)-O-CH₂-C(CH₂-O-CH₂) ]₂ | 820 |
| Example 7 | CH₃-N(tetramethylpiperidine)-O-CH₂-C(C₂H₅)(CH₂O-)(CH₂O-)-N(tetramethylpiperidine)-CH₃ | 800 |
| Example 8 | benzoyl-O-[CH₂-C(CH₃)(CH₂O-tetramethylpiperidine-NH)-CH₂-O-]₂-benzoyl | 780 |
| Example 9 | HO-[CH₂-C(CH₂O-tetramethylpiperidine-NCH₃)(CH₂O-tetramethylpiperidine-NCH₃)-CH₂-O-]₄-H | 840 |

TABLE I-continued

| Example No. | Piperidyl Ether Stabilizer | Hours to Failure |
|---|---|---|
| Example 10 | $HO\text{---}\left[CH_2\text{---}\underset{\underset{CH_2\text{---}O\text{---}\underset{\underset{CH_3\ CH_3}{}}{\overset{\overset{CH_3\ CH_3}{}}{\bigcirc}}\text{---}NCH_3}{\big|}}{C}\text{---}CH_2O\right]_2\text{---}_7 H$ | 800 |

The improved effect obtained using the piperidyl ethers of the invention as compared to the Controls is apparent from the data.

EXAMPLES 11 TO 20

Polypropylene compositions were prepared using stabilizers of the invention and of the prior art, and having the following formulation:

| Ingredient | Parts by Weight |
|---|---|
| Polypropylene | 100 |
| Stearyl β-3,5-di-tert-butyl-4-hydroxyphenyl propionate | 0.2 |
| Stabilizer as shown in Table II | 0.3 |

The compositions were thoroughly blended in a Brabender Plastograph, and then compression-molded to form sheets 0.3 mm thick. Pieces 2.5 cm² were cut off from the sheets and exposed to a high voltage mercury lamp and with and without immersion in hot water at 80° C. for 15 hours. The hours to failure were noted, and the results are shown in Table II.

TABLE II

| | | Hours to Failure | |
|---|---|---|---|
| Example No. | Piperidyl Ether Stabilizer | Without Immersion | After Immersion for 15 hours |
| Control 1 | 1,2-Bis(2,2,6,6-tetramethyl-4-piperidyloxy) ethane | 480 | 370 |
| Control 2 | 1,2-Bis(1,2,2,6,6-pentamethyl-4-piperidyloxy) ethane | 470 | 390 |
| Control 3 | N—Acetyl-2,2,6,6-tetramethyl-4-piperidyl glycidylether polymer (M.W.; 800) | 520 | 450 |
| Example 11 | [structure] | 820 | 760 |
| Example 12 | [structure] | 800 | 740 |
| Example 13 | [structure] | 720 | 650 |
| Example 14 | [structure] | 780 | 730 |

TABLE II-continued

| Example No. | Piperidyl Ether Stabilizer | Hours to Failure | |
|---|---|---|---|
| | | Without Immersion | After Immersion for 15 hours |
| Example 15 | [2,2,6,6-tetramethyl-1-methyl-4-piperidyl-O-CH₂]₂-C(CH₂O-)₂ linked to 2,2,6,6-tetramethyl-4-piperidyl-NH ring system | 800 | 750 |
| Example 16 | {[2,2,6,6-tetramethyl-4-piperidyl(HN)-O-CH₂-CH₂-O]-CH₂-C(CH₂-O)₂ with 2,2,6,6-tetramethyl-4-piperidyl(NH) group -C(=O)-}₂ | 850 | 820 |
| Example 17 | {[2,2,6,6-tetramethyl-4-piperidyl(HN)-OCH₂]₃-C-CH₂-C(=O)-}₂ | 820 | 790 |

TABLE II-continued

| Example No. | Piperidyl Ether Stabilizer | Hours to Failure | |
|---|---|---|---|
| | | Without Immersion | After Immersion for 15 hours |
| Example 18 | ![structure] | 810 | 790 |
| Example 19 | ![structure] | 880 | 850 |

TABLE II-continued
| Example No. | Piperidyl Ether Stabilizer | Hours to Failure | |
| --- | --- | --- | --- |
| | | Without Immersion | After Immersion for 15 hours |
| Example 20 | 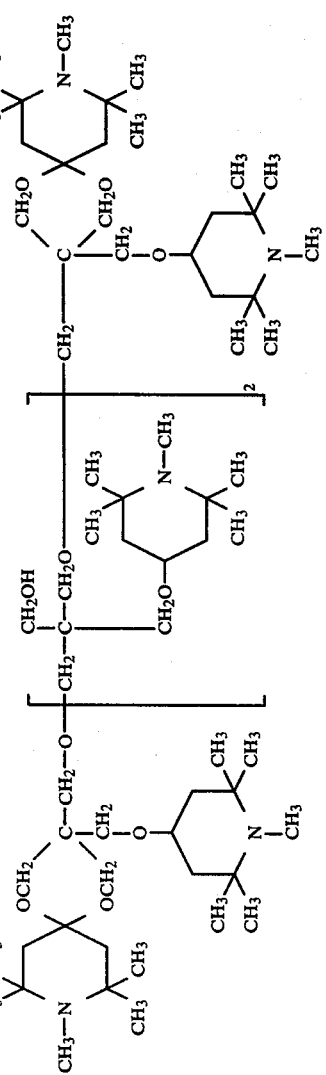 | 840 | 810 |

The improved effect obtained using the piperidyl ethers of the invention as compared to the Controls is apparent from the data.

EXAMPLES 21 TO 30

Ethylene-vinyl acetate copolymer compositions were prepared using stabilizers of the invention and two of the prior art, and having the following formulation:

| Ingredient | Parts by Weight |
|---|---|
| Ethylene-vinylacetate copolymer | 100 |
| 2,6-di-t-butyl-p-cresol | 0.1 |
| Ca stearate | 0.1 |
| Zn stearate | 0.1 |
| Diisodecylphenylphosphite | 0.2 |
| Stabilizer as shown in Table III | 0.2 |

The stabilizer was blended with the polymer on a two-roll mill at 130° C., and sheets 0.4 mm thick were then compression-molded at 140° C. from the resulting blend. Pieces 2.5 cm square were cut off from the sheets and exposed to ultraviolet light in a Weather-O-Meter for 500 hours. At the start and at the conclusion of the test, tensile strength of the sheet samples was determined. The results are shown in Table III as % retention of the initially determined tensile strength:

TABLE III

| Example No. | Piperidyl Ether Stabilizer | % Retention of Tensile Strength After 500 Hours |
|---|---|---|
| Control 1 | 1,2-Bis(2,2,6,6-tetramethyl-4-piperidyloxy) ethane | 64 |
| Control 2 | N—Acetyl-2,2,6,6-tetramethyl-4-piperidyl glycidylether polymer (M.W.; 800) | 68 |
| Example 21 | [structure] | 80 |
| Example 22 | [structure] | 77 |
| Example 23 | [structure] | 75 |
| Example 24 | [structure] | 73 |
| Example 25 | [structure] | 81 |

TABLE III-continued

| Example No. | Piperidyl Ether Stabilizer | % Retention of Tensile Strength After 500 Hours |
|---|---|---|
| Example 26 | [structure: pentaerythritol-based tetra-ether with four 2,2,6,6-tetramethyl-4-piperidyloxy groups linked via CH₂O, with spiro bis-piperidyl ketal] | 82 |
| Example 27 | HO—[CH₂—C(CH₃)(CH₂O-piperidyl-N-CH₃)—CH₂—O]₈—H | 78 |
| Example 28 | HO—[CH₂—C(CH₂O-piperidyl-NCH₃)₂—CH₂—O]₄—H | 82 |
| Example 29 | C₇H₁₅CO—O—[CH₂—C(CH₂O-piperidyl-NH)₂—CH₂O]₄—OC—C₇H₁₅ | 79 |
| Example 30 | HO—[CH₂—C(CH₂O-piperidyl-NH)₂—CH₂OCC₂H₄CO—O]₄—CH₃ | 80 |

The improved effect obtained using the piperidyl ethers of the invention as compared to the Controls is apparent from the data.

EXAMPLES 31 TO 41

High density polyethylene compositions were prepared using stabilizers of the invention and of the prior art, and having the following formulation:

| Ingredient | Parts by Weight |
| --- | --- |
| High density polyethylene | 100 |
| Ca stearate | 1 |
| Tetrakis-(methylene-3-(3,5-di-t-butyl-4-hydroxyphenyl)propionate)methane | 0.1 |
| Distearylthiodipropionate | 0.3 |
| Stabilizer as shown in Table IV | 0.2 |

The stabilizer was blended with the polymer on a two-roll mill and sheets 0.5 mm thick were prepared by compression-molding of the blend. Pieces 2.5 cm square were cut off from the sheets, and exposed in a Weather-O-Meter to ultraviolet light. The time in hours when degradation set in, as determined by a significant discoloration and/or embrittlement, was noted as hours to failure, and the results are reported in Table IV:

TABLE IV

| Example No. | Piperidyl Ether Stabilizer | Hours to Failure |
| --- | --- | --- |
| Control 1 | 1,2-Bis(2,2,6,6-tetramethyl-4-piperidyloxy)ethane | 650 |
| Control 2 | N—Acetyl-2,2,6,6-tetramethyl-4-piperidyl glycidylether polymer (M.W.; 800) | 770 |
| Example 31 | (structure) | 1,210 |
| Example 32 | (structure) | 1,250 |
| Example 33 | (structure) | 1,130 |
| Example 34 | (structure) | 1,040 |
| Example 35 | (structure) | 1,220 |

TABLE IV-continued

| Example No. | Piperidyl Ether Stabilizer | Hours to Failure |
|---|---|---|
| Example 36 | (structure) | 1,190 |
| Example 37 | (structure) | 1,210 |
| Example 38 | (structure) | 1,240 |
| Example 39 | (structure) | 1,200 |
| Example 40 | (structure) | 1,190 |

TABLE IV-continued

| Example No. | Piperidyl Ether Stabilizer | Hours to Failure |
|---|---|---|
| Example 41 | [structure: HO—[CH₂—C(CH₃)(CH₂O-piperidyl)—CH₂OC(O)C₄H₈C(O)O—]₆—C₂H₅ where piperidyl = 2,2,6,6-tetramethyl-4-piperidyl (NH)] | 1,220 |

The improved effect obtained using the piperidyl ethers of the invention as compared to the Controls is apparent from the data.

EXAMPLES 42 TO 50

Acrylonitrile-butadiene-styrene terpolymer resin compositions were prepared using stabilizers of the invention and of the prior art, and having the following formulation:

| Ingredient | Parts by Weight |
|---|---|
| Acrylonitrile-butadiene-styrene terpolymer | 100 |
| 4,4'-butylidene-bis(2-tert-butyl-m-cresol) | 0.1 |
| Stabilizer as shown in Table V | 0.3 |

The stabilizer was blended with the resin on a two-roll mill, and sheets 3 mm thick were prepared by compression molding of the resulting blend. Pieces 2.5 cm square were cut off from the sheets, and subjected to ultraviolet light in a Weather-O-Meter for 800 hours. Tensile strength before and after the test exposure was determined, and the results reported as the percent of tensile strength retained, at the end of this time, in Table V.

TABLE V

| Example No. | Piperidyl Ether Stabilizer | % Tensile Strength Retained |
|---|---|---|
| Control 1 | 1,2-Bis(1,2,2,6,6-pentamethyl-4-piperidyloxy) ethane | 57 |
| Control 2 | N—Acetyl-2,2,6,6-tetramethyl-4-piperidyl glycidylether polymer (M.W.; 800) | 62 |
| Example 42 | [HN-2,2,6,6-tetramethylpiperidyl—O—CH₂—C(CH₂-O-CH₂ oxetane)]₂ | 84 |
| Example 43 | [CH₃COC₂H₄—N(2,2,6,6-tetramethylpiperidyl)—O—CH₂—C(CH₂-O-CH₂ oxetane)]₂ | 82 |
| Example 44 | HN(2,2,6,6-tetramethylpiperidyl)—O—CH₂—C(CH₃)(CH₂O—)(CH₂O—)—piperidyl-NH | 84 |
| Example 45 | CH₃—N(2,2,6,6-tetramethylpiperidyl)—O—CH₂—C(C₂H₅)(CH₂O—)(CH₂O—)—piperidyl-N—CH₃ | 85 |

TABLE V-continued

| Example No. | Piperidyl Ether Stabilizer | % Tensile Strength Retained |
|---|---|---|
| Example 46 | (structure) | 76 |
| Example 47 | (structure) | 80 |
| Example 48 | (structure) | 81 |
| Example 49 | (structure) | 82 |
| Example 50 | (structure) | 80 |

The improved effect obtained using the piperidyl ethers of the invention as compared to the Controls is apparent from the data.

EXAMPLES 51 TO 60

Conventional heat stabilizers for polymeric materials may lose their effectiveness because of volatilization or decomposition at high polymer processing temperatures. This is not true of the stabilizers of the invention, as shown by observing the effect of heat in repeated extrusions of ethylene-propylene copolymer compositions. These compositions were prepared using stabilizers of the invention and of the prior art, and having the following formulation:

| Ingredient | Parts by Weight |
|---|---|
| Ethylene-propylene copolymer | 100 |
| Ca stearate | 0.2 |
| Stearyl-(3,5-di-t-butyl-4-hydroxyphenyl) propionate | 0.1 |
| Dilauryl thiodipropionate | 0.2 |
| Stabilizer as shown in Table VI | 0.2 |

The ingredients were mixed and the compositions then extruded (cylinder temperature 230° C. and 240° C., head die temperature 250° C., velocity 20 rpm) five times. Test pieces were then molded by injection molding at 250° C. The test pieces were exposed to a high voltage mercury lamp, and the hours to failure noted as shown in Table VI:

TABLE VI

| Example No. | Piperidyl Ether Stabilizer | Hours to Failure Extruded 1 time | Extruded 5 times |
|---|---|---|---|
| Control 1 | 1,2-Bis(2,2,6,6-tetramethyl-4-piperidyloxy) ethane | 370 | 210 |
| Control 2 | N—Acetyl—2,2,6,6-tetramethyl-4-piperidyl glycidylether polymer (M.W.; 800) | 480 | 330 |
| Example 51 | [structure] | 620 | 530 |
| Example 52 | [structure] | 660 | 600 |
| Example 53 | [structure] | 630 | 550 |
| Example 54 | [structure] | 650 | 580 |
| Example 55 | [structure] | 630 | 590 |

TABLE VI-continued

| Example No. | Piperidyl Ether Stabilizer | Hours to Failure Extruded 1 time | Hours to Failure Extruded 5 times |
|---|---|---|---|
| Example 56 | (structure) | 600 | 530 |
| Example 57 | (structure) | 680 | 630 |
| Example 58 | (structure) | 640 | 580 |
| Example 59 | (structure) | 620 | 530 |

TABLE VI-continued

| Example No. | Piperidyl Ether Stabilizer | Hours to Failure Extruded 1 time | Hours to Failure Extruded 5 times |
|---|---|---|---|
| Example 60 | 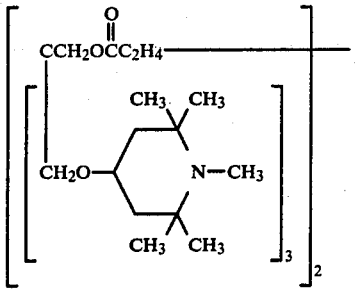 | 630 | 540 |

The improved effect obtained using the piperidyl ethers of the invention as compared to the Controls is apparent from the data.

EXAMPLES 61 TO 69

Polyurethane resin compositions were prepared using stabilizers of the invention and of the prior art and having the following formulation:

| Ingredient | Parts by Weight |
|---|---|
| Polyurethane resin (Asahi Denka[1] U-100) | 100 |
| Ba stearate | 0.7 |
| Zn stearate | 0.3 |
| 2,6-di-t-butyl-p-cresol | 0.1 |
| Stabilizer as shown in Table VII | 0.3 |

[1]A polyurethane-isocyanurate made from toluene diisocyanate and alkylene polyol.

The stabilizer was blended with the finely powdered polyurethane resin on a two-roll for five minutes at 70° C., and the sheet was then compression-molded at 120° C. for five minutes to form sheets 0.5 mm thick. Pieces 2.5 cm square were cut out from the sheets, and exposed to ultraviolet light in a Weather-O-Meter for thirty hours. Elongation before and after exposure was determined, and the percent elongation retained after the exposure is given in Table VII.

TABLE VII

| Example No. | Piperidyl Ether Stabilizer | % Elongation Retention |
|---|---|---|
| Control 1 | 1,2-Bis(2,2,6,6-tetramethyl-4-piperidyloxy) ethane | 52 |
| Control 2 | 1,2-Bis(1,2,2,6,6-pentamethyl-4-piperidyloxy) ethane | 53 |
| Example 61 | 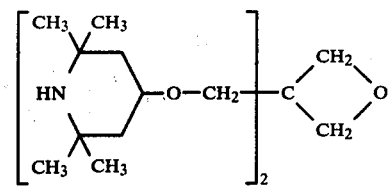 | 77 |
| Example 62 | 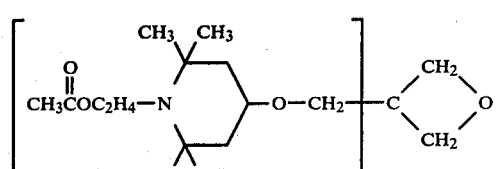 | 75 |
| Example 63 | 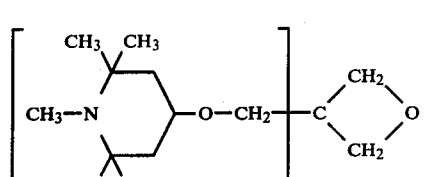 | 77 |

TABLE VII-continued

| Example No. | Piperidyl Ether Stabilizer | % Elongation Retention |
|---|---|---|
| Example 64 | (structure) | 79 |
| Example 65 | (structure) | 72 |
| Example 66 | (structure) | 74 |
| Example 67 | (structure) | 72 |
| Example 68 | (structure) | 75 |

TABLE VII-continued

| Example No. | Piperidyl Ether Stabilizer | % Elongation Retention |
|---|---|---|
| Example 69 | 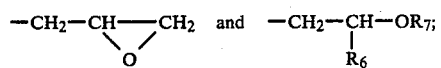 | 74 |

The improved effect obtained using the piperidyl ethers of the invention as compared to the Controls is apparent from the data.

Having regard to the foregoing disclosure, the following is claimed as the inventive and patentable embodiments thereof:

1. A stabilizer composition for synthetic resins comprising:
   (1) at least one 2,2,6,6-tetramethyl piperidyl ether having the formula:

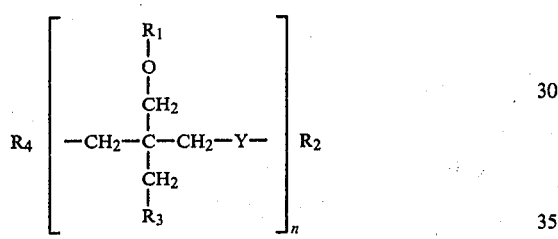

wherein:
$R_1$ is selected from the group consisting of

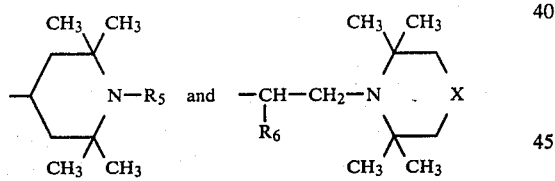

$R_2$ is selected from the group consisting of hydrogen, alkyl, hydroxyalkyl, saturated and unsaturated acyl having from one to about eighteen carbon atoms; $R_1$ and

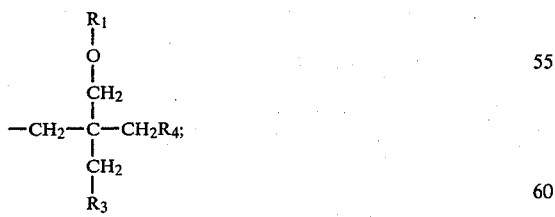

$R_3$ is selected from the group consisting of hydrogen, alkyl and hydroxyalkyl having from one to about eighteen carbon atoms; cycloalkyl and alkylphenyl having from six to about eighteen carbon atoms; and $-OR_1$;

$R_4$ is selected from the group consisting of hydroxyl, alkoxy having from one to about ten carbon atoms, acyloxy having from one to about ten carbon atoms, and $-OR_1$;

$R_5$ is selected from the group consisting of hydrogen, oxy; alkyl, hydroxyalkyl and alkenyl having from one to about eighteen carbon atoms; cycloalkyl and alkylphenyl having from six to about eighteen carbon atoms;

$$-CH_2-CH\underset{O}{\overset{}{\diagdown\diagup}}CH_2 \quad \text{and} \quad -CH_2-\underset{R_6}{\overset{}{CH}}-OR_7;$$

$R_6$ is selected from the group consisting of hydrogen, alkyl and hydroxyalkyl having from one to about eighteen carbon atoms; cycloalkyl and alkylphenyl having from six to about eighteen carbon atoms;

$R_7$ is hydrogen or acyl having from one to about eighteen carbon atoms;

$R_8$ is alkylene having from one to about ten carbon atoms;

X is selected from the group consisting of methylene, $-CH_2-$, carbonyl $C=O$, $>CH-O-R_7$ and

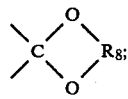

Y is oxy $-O-$ or 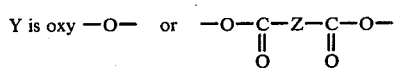

where Z is alkylene or thioalkylene having from two to about ten carbon atoms; or phenylene having from six to about ten carbon atoms; and n is a number from 1 to 50; $R_2$ and $R_3$; or $R_2$ and $R_4$ can be taken together to form

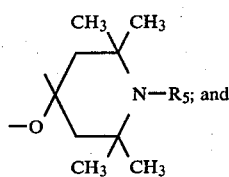

when n is 1 and Y is $-O-$, $R_2$ and $R_3$ or $R_2$ and $R_4$ can be connected together as a C—C linkage to form a cyclic ring, or

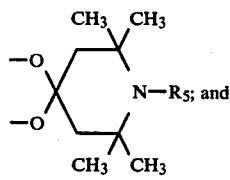

N—R5; and (2) at least one phenolic antioxidant having at least one phenolic hydroxyl group, and at least one phenolic nucleus, and from about eight to about three hundred carbon atoms.

2. A stabilizer composition for synthetic resins according to claim 1 in which the phenolic antioxidant is a monocyclic phenol having the structure:

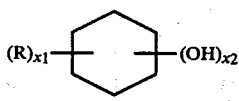

wherein:
R is selected from the group consisting of hydrogen; halogen; and organic radicals containing from one to about thirty carbon atoms selected from the group consisting of alkyl, aryl, alkenyl, alkaryl, aralkyl, cycloalkenyl, cycloalkyl, alkoxy, and

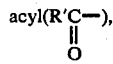

where
R' is aryl, alkyl or cycloalkyl; and
$x_1$ and $x_2$ are integers from one to four, and the sum of $x_1$ and $x_2$ does not exceed six.

3. A stabilizer composition for synthetic resins according to claim 1 in which the phenolic antioxidant is a polycyclic phenol having at least two aromatic nuclei linked by a polyvalent linking radical, as defined by the formula:

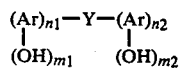

wherein:
Y is a polyvalent linking group selected from the group consisting of oxygen; carbonyl; sulfur; sulfinyl; aromatic, aliphatic and cycloaliphatic hydrocarbon groups; and oxyhydrocarbon; thiohydrocarbon and heterocyclic groups having from one up to twenty carbon atoms;
Ar is a phenolic nucleus selected from the group consisting of phenyl and polycarbocyclic groups having condensed or separate phenyl rings; each Ar group containing at least one free phenolic hydroxyl group up to a total of five; and
$m_1$ and $m_2$ are numbers from one to five, and $n_1$ and $n_2$ are number of one or greater.

4. A stabilizer composition for synthetic resins according to claim 1 in which the phenolic antioxidant is a polyhydric polycyclic phenol having the structure:

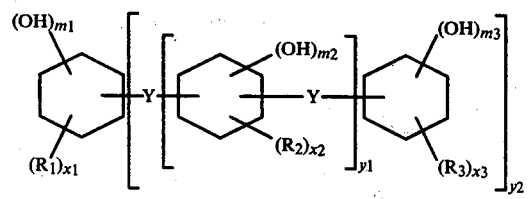

wherein:
$R_1$, $R_2$ and $R_3$ are inert substituent groups;
$m_1$ and $m_3$ are integers from one to a maximum of five;
$m_2$ is an integer from one to a maximum of four;
$x_1$ and $x_3$ are integers from zero to four, and $x_2$ is an integer from zero to three;
$y_1$ is an integer from zero to about six; and
$y_2$ is an integer from one to five.

5. A stabilizer composition according to claim 1 in which $R_1$ is

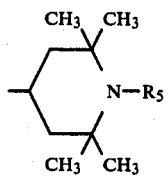

6. A stabilizer composition according to claim 1 in which $R_1$ is

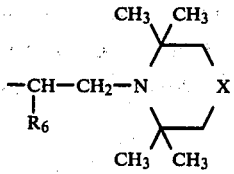

7. A stabilizer composition according to claim 1 in which X is —$CH_2$—.

8. A stabilizer composition according to claim 1 in which X is C=O.

9. A stabilizer composition according to claim 1 in which X is >CH—O—$R_7$.

10. A stabilizer composition according to claim 1 in which X is

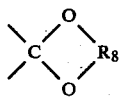

11. A stabilizer composition according to claim 1 in which Y is oxy.

12. A stabilizer composition according to claim 1 in which Y is

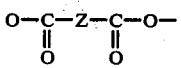

13. A stabilizer composition according to claim 12 in which Z is alkylene.

14. A stabilizer composition according to claim 12 in which Z is phenylene.

15. A stabilizer composition according to claim 1 in which $R_2$ and $R_3$ are taken together to form

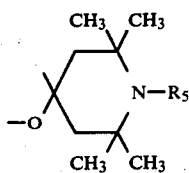

16. A stabilizer composition according to claim 1 in which n is 1, Y is —O—, and $R_2$ and $R_3$ are taken together as a C—C linkage to form a cyclic ring.

17. A stabilizer composition according to claim 1 in which $R_2$ and $R_4$ are taken together to form

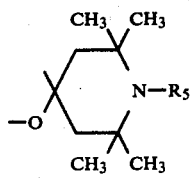

18. A stabilizer composition according to claim 1 in which n is 1, Y is —O—, and $R_2$ and $R_4$ are taken together as a C—C linkage to form a cyclic ring.

19. A polyvinyl chloride resin composition having improved resistance to deterioration comprising a polyvinyl chloride resin and a 2,2,6,6-tetramethyl piperidyl ether having the formula:

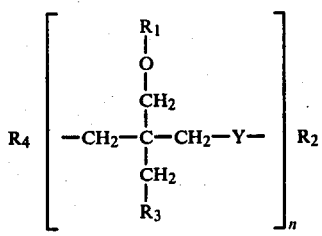

wherein:

$R_1$ is selected from the group consisting of

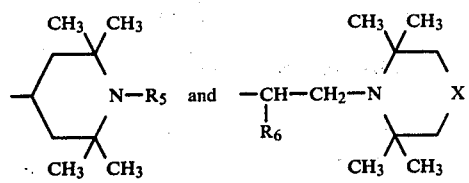

$R_2$ is selected from the group consisting of hydrogen, alkyl, hydroxyalkyl, saturated and unsaturated acyl having from one to about eighteen carbon atoms; $R_1$ and

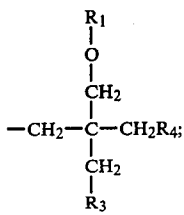

$R_3$ is selected from the group consisting of hydrogen, alkyl and hydroxyalkyl having from one to about eighteen carbon atoms; cycloalkyl and alkylphenyl having from six to about eighteen carbon atoms; and —$OR_1$;

$R_4$ is selected from the group consisting of hydroxyl, alkoxy having from one to about ten carbon atoms, acyloxy having from one to about ten carbon atoms, and —$OR_1$;

$R_5$ is selected from the group consisting of hydrogen, oxy; alkyl, hydroxyalkyl and alkenyl having from one to about eighteen carbon atoms; cycloalkyl and alkylphenyl having from six to about eighteen carbon atoms;

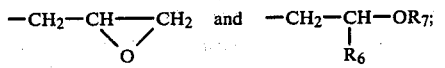

$R_6$ is selected from the group consisting of hydrogen, alkyl and hydroxyalkyl having from one to about eighteen carbon atoms; cycloalkyl and alkylphenyl having from six to about eighteen carbon atoms;

$R_7$ is hydrogen or acyl having from one to about eighteen carbon atoms;

$R_8$ is alkylene having from one to about ten carbon atoms;

X is selected from the group consisting of methylene, —$CH_2$—, carbonyl C=O, >CH—O—$R_7$ and

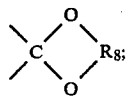

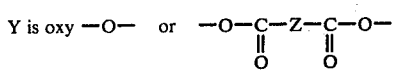

where Z is alkylene or thioalkylene having from two to about ten carbon atoms; or phenylene having from six to about ten carbon atoms; and n is a number from 1 to 50; $R_2$ and $R_3$; or $R_2$ and $R_4$ can be taken together to form

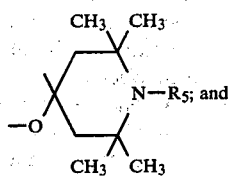

when n is 1 and Y is —O—, $R_2$ and $R_3$ or $R_2$ and $R_4$ can be connected together as a C—C linkage to form a cyclic ring, or

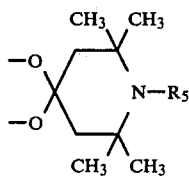

20. A polyvinyl chloride resin composition in accordance with claim 19 in which the polyvinyl chloride resin is polyvinyl chloride homopolymer.

21. A polyvinyl chloride resin composition in accordance with claim 19 in which the polyvinyl chloride resin is a copolymer of vinyl chloride and vinyl acetate.

22. An olefin polymer composition having improved resistance to deterioration comprising an olefin polymer selected from the group consisting of polymers of alpha-olefins having from two to six carbon atoms and polystyrene, and a 2,2,6,6-tetramethyl piperidyl ether having the formula:

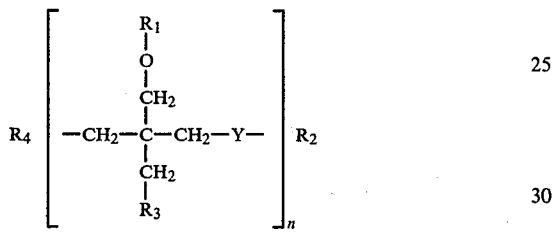

wherein:
$R_1$ is selected from the group consisting of

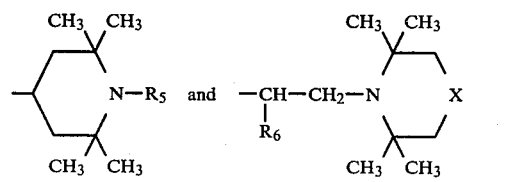

$R_2$ is selected from the group consisting of hydrogen, alkyl, hydroxyalkyl, saturated and unsaturated acyl having from one to about eighteen carbon atoms; $R_1$ and

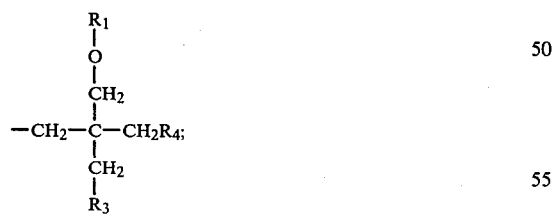

$R_3$ is selected from the group consisting of hydrogen, alkyl and hydroxyalkyl having from one to about eighteen carbon atoms; cycloalkyl and alkylphenyl having from six to about eighteen carbon atoms; and $—OR_1$;

$R_4$ is selected from the group consisting of hydroxyl, alkoxy having from one to about ten carbon atoms, acyloxy having from one to about ten carbon atoms, and $—OR_1$;

$R_5$ is selected from the group consisting of hydrogen, oxy; alkyl, hydroxyalkyl and alkenyl having from one to about eighteen carbon atoms; cycloalkyl and alkylphenyl having from six to about eighteen carbon atoms;

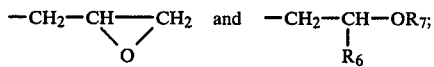

$R_6$ is selected from the group consisting of hydrogen, alkyl and hydroxyalkyl having from one to about eighteen carbon atoms; cycloalkyl and alkylphenyl having from six to about eighteen carbon atoms;

$R_7$ is hydrogen or acyl having from one to about eighteen carbon atoms;

$R_8$ is alkylene having from one to about ten carbon atoms;

X is selected from the group consisting of methylene, $—CH_2—$, carbonyl $C=O$, $>CH—O—R_7$ and

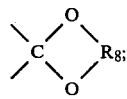

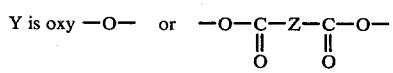

where Z is alkylene or thioalkylene having from two to about ten carbon atoms; or phenylene having from six to about ten carbon atoms; and n is a number from 1 to 50; $R_2$ and $R_3$; or $R_2$ and $R_4$ can be taken together to form

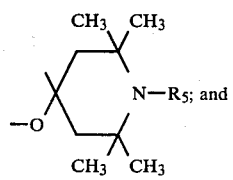

when n is 1 and Y is $—O—$, $R_2$ and $R_3$ or $R_2$ and $R_4$ can be connected together as a C—C linkage to form a cyclic ring, or

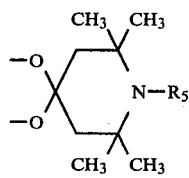

23. An olefin polymer composition in accordance with claim 22 wherein the polyolefin is polypropylene.

24. An olefin polymer composition in accordance with claim 22 wherein the polyolefin is polyethylene.

25. An olefin polymer composition in accordance with claim 22 wherein the polyolefin is ethylene-propylene copolymer.

26. An ethylene-vinyl acetate copolymer composition having improved resistance to deterioration comprising an ethylene-vinyl acetate copolymer and a 2,2,6,6-tetramethyl piperidyl ether having the formula:

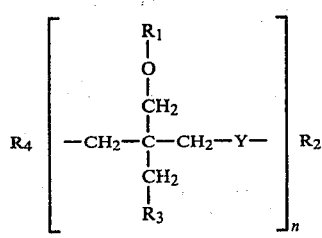

wherein:
R₁ is selected from the group consisting of

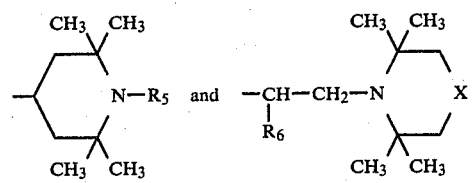

R₂ is selected from the group consisting of hydrogen, alkyl, hydroxyalkyl, saturated and unsaturated acyl having from one to about eighteen carbon atoms; R₁ and

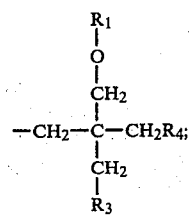

R₃ is selected from the group consisting of hydrogen, alkyl and hydroxyalkyl having from one to about eighteen carbon atoms; cycloalkyl and alkylphenyl having from six to about eighteen carbon atoms; and —OR₁;

R₄ is selected from the group consisting of hydroxyl, alkoxy having from one to about ten carbon atoms, acyloxy having from one to about ten carbon atoms, and —OR₁;

R₅ is selected from the group consisting of hydrogen, oxy; alkyl, hydroxyalkyl and alkenyl having from one to about eighteen carbon atoms; cycloalkyl and alkylphenyl having from six to about eighteen carbon atoms;

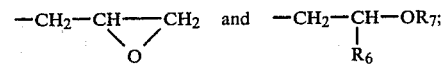

R₆ is selected from the group consisting of hydrogen, alkyl and hydroxyalkyl having from one to about eighteen carbon atoms; cycloalkyl and alkylphenyl having from six to about eighteen carbon atoms;

R₇ is hydrogen or acyl having from one to about eighteen carbon atoms;

R₈ is alkylene having from one to about ten carbon atoms;

X is selected from the group consisting of methylene, —CH₂—, carbonyl C=O, >CH—O—R₇ and

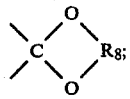

Y is oxy —O— or —O—C(=O)—Z—C(=O)—O— where Z is alkylene or thioalkylene having from two to about ten carbon atoms; or phenylene having from six to about ten carbon atoms; and n is a number from 1 to 50; R₂ and R₃; or R₂ and R₄ can be taken together to form

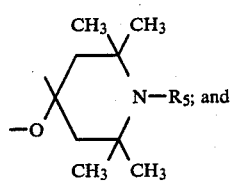

when n is 1 and Y is —O—, R₂ and R₃ or R₂ and R₄ can be connected together as a C—C linkage to form a cyclic ring, or

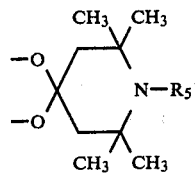

27. An acrylonitrile-butadiene-styrene polymer having improved resistance to deterioration comprising an acrylonitrile-butadiene-styrene polymer and a 2,2,6,6-tetramethyl piperidyl ether having the formula:

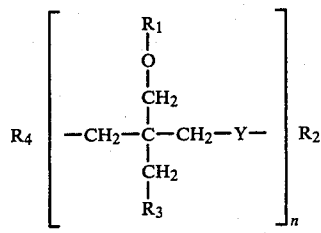

wherein:
R₁ is selected from the group consisting of

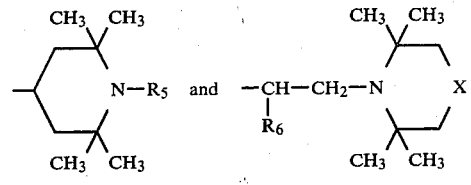

R₂ is selected from the group consisting of hydrogen, alkyl, hydroxyalkyl, saturated and unsaturated acyl having from one to about eighteen carbon atoms; R₁ and

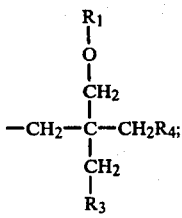

R$_3$ is selected from the group consisting of hydrogen, alkyl and hydroxyalkyl having from one to about eighteen carbon atoms; cycloalkyl and alkylphenyl having from six to about eighteen carbon atoms; and —OR$_1$;

R$_4$ is selected from the group consisting of hydroxyl, alkoxy having from one to about ten carbon atoms, acyloxy having from one to about ten carbon atoms, and —OR$_1$;

R$_5$ is selected from the group consisting of hydrogen, oxy; alkyl, hydroxyalkyl and alkenyl having from one to about eighteen carbon atoms; cycloalkyl and alkylphenyl having from six to about eighteen carbon atoms;

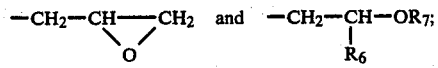

R$_6$ is selected from the group consisting of hydrogen, alkyl and hydroxyalkyl having from one to about eighteen carbon atoms; cycloalkyl and alkylphenyl having from six to about eighteen carbon atoms;

R$_7$ is hydrogen or acyl having from one to about eighteen carbon atoms;

R$_8$ is alkylene having from one to about ten carbon atoms;

X is selected from the group consisting of methylene, —CH$_2$—, carbonyl C=O, >CH—O—R$_7$ and

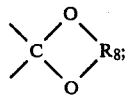

Y is oxy —O— or —O—C(=O)—Z—C(=O)—O— where Z is alkylene or thioalkylene having from two to about ten carbon atoms; or phenylene having from six to about ten carbon atoms; and n is a number from 1 to 50; R$_2$ and R$_3$; or R$_2$ and R$_4$ can be taken together to form

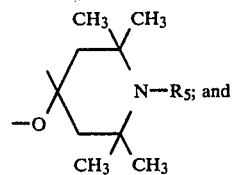

when n is 1 and Y is —O—, R$_2$ and R$_3$ or R$_2$ and R$_4$ can be connected together as a C—C linkage to form a cyclic ring, or

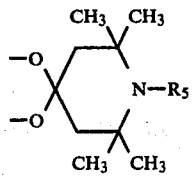

28. A polyurethane resin composition having improved resistance to deterioration comprising a polyurethane resin and a 2,2,6,6-tetramethyl piperidyl ether having the formula:

$$\left[ R_4 - CH_2 - \underset{\underset{R_3}{\overset{\overset{R_1}{\overset{|}{O}}}{\overset{|}{C}}}}{\overset{CH_2}{\underset{CH_2}{|}}} - CH_2 - Y - \right]_n R_2$$

wherein:

R$_1$ is selected from the group consisting of

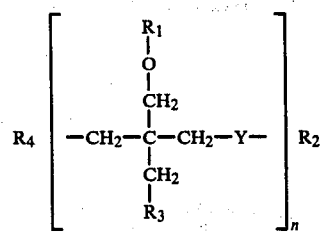

R$_2$ is selected from the group consisting of hydrogen, alkyl, hydroxyalkyl, saturated and unsaturated acyl having from one to about eighteen carbon atoms; R$_1$ and

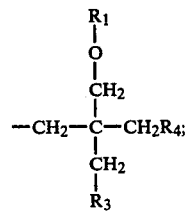

R$_3$ is selected from the group consisting of hydrogen, alkyl and hydroxyalkyl having from one to about eighteen carbon atoms; cycloalkyl and alkylphenyl having from six to about eighteen carbon atoms; and —OR$_1$;

R$_4$ is selected from the group consisting of hydroxyl, alkoxy having from one to about ten carbon atoms, acyloxy having from one to about ten carbon atoms, and —OR$_1$;

R$_5$ is selected from the group consisting of hydrogen, oxy; alkyl, hydroxyalkyl and alkenyl having from one to about eighteen carbon atoms; cycloalkyl and alkylphenyl having from six to about eighteen carbon atoms;

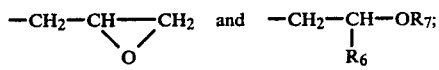 and —CH₂—CH—OR₇;
                                          |
                                          R₆

R₆ is selected from the group consisting of hydrogen, alkyl and hydroxyalkyl having from one to about eighteen carbon atoms; cycloalkyl and alkylphenyl having from six to about eighteen carbon atoms;

R₇ is hydrogen or acyl having from one to about eighteen carbon atoms;

R₈ is alkylene having from one to about ten carbon atoms;

X is selected from the group consisting of methylene, —CH₂—, carbonyl C═O, >CH—O—R₇ and

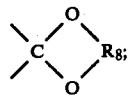

Y is oxy —O— or 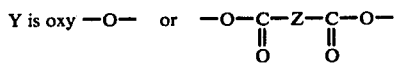

where Z is alkylene or thioalkylene having from two to about ten carbon atoms; or phenylene having from six to about ten carbon atoms; and n is a number from 1 to 50; R₂ and R₃; or R₂ and R₄ can be taken together to form

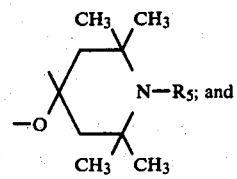

when n is 1 and Y is —O—, R₂ and R₃ or R₂ and R₄ can be connected together as a C—C linkage to form a cyclic ring, or

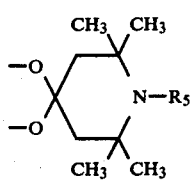

29. A polyvinyl chloride resin composition having improved resistance to deterioration comprising a polyvinyl chloride resin, an organic phosphite and a 2,2,6,6-tetramethyl piperidyl ether having the formula:

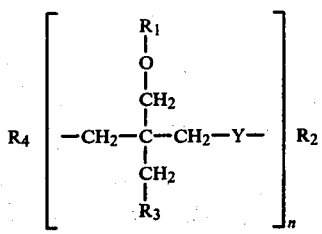

wherein:

R₁ is selected from the group consisting of

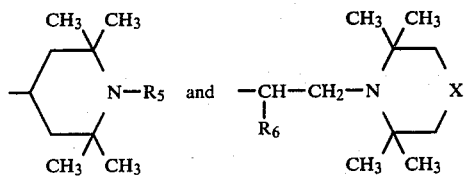

R₂ is selected from the group consisting of hydrogen, alkyl, hydroxyalkyl, saturated and unsaturated acyl having from one to about eighteen carbon atoms; R₁ and

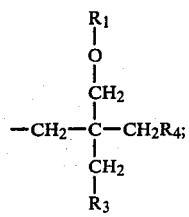

R₃ is selected from the group consisting of hydrogen, alkyl and hydroxyalkyl having from one to about eighteen carbon atoms; cycloalkyl and alkylphenyl having from six to about eighteen carbon atoms; and —OR₁;

R₄ is selected from the group consisting of hydroxyl, alkoxy having from one to about ten carbon atoms, acyloxy having from one to about ten carbon atoms, and —OR₁;

R₅ is selected from the group consisting of hydrogen, oxy; alkyl, hydroxyalkyl and alkenyl having from one to about eighteen carbon atoms; cycloalkyl and alkylphenyl having from six to about eighteen carbon atoms;

—CH₂—CH——CH₂ and —CH₂—CH—OR₇;
       \  /                    |
        O                      R₆

R₆ is selected from the group consisting of hydrogen, alkyl and hydroxyalkyl having from one to about eighteen carbon atoms; cycloalkyl and alkylphenyl having from six to about eighteen carbon atoms;

R₇ is hydrogen or acyl having from one to about eighteen carbon atoms;

R₈ is alkylene having from one to about ten carbon atoms;

X is selected from the group consisting of methylene, —CH₂—, carbonyl C═O, >CH—O—R₇ and

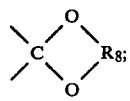

Y is oxy —O— or 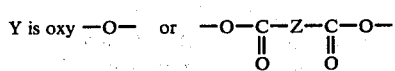

where Z is alkylene or thioalkylene having from two to about ten carbon atoms; or phenylene having from six to about ten carbon atoms; and n is a number from 1 to 50; $R_2$ and $R_3$; or $R_2$ and $R_4$ can be taken together to form

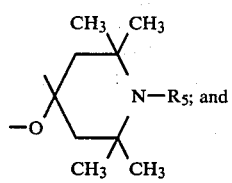

when n is 1 and Y is —O—, $R_2$ and $R_3$ or $R_2$ and $R_4$ can be connected together as a C—C linkage to form a cyclic ring, or

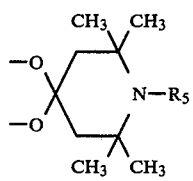

30. A polyvinyl chloride resin composition in accordance with claim 29 in which the polyvinyl chloride resin is polyvinyl chloride homopolymer.

31. A polyvinyl chloride resin composition in accordance with claim 29 in which the polyvinyl chloride resin is a copolymer of vinyl chloride and vinyl acetate.

32. An olefin polymer composition having improved resistance to deterioration comprising an olefin polymer selected from the group consisting of polymers of alpha-olefins having from two to six carbon atoms and polystyrene, and a stabilizer composition in accordance with claim 1.

33. An olefin polymer composition in accordance with claim 32 wherein the polyolefin is polypropylene.

34. An olefin polymer composition in accordance with claim 32 wherein the polyolefin is polyethylene.

35. An olefin polymer composition in accordance with claim 32 wherein the polyolefin is ethylene-propylene copolymer.

36. An ethylene-vinyl acetate copolymer composition having improved resistance to deterioration comprising an ethylene-vinyl acetate copolymer and a stabilizer composition in accordance with claim 1.

37. An acrylonitrile-butadiene-styrene polymer having improved resistance to deterioration comprising an acrylonitrile-butadiene-styrene polymer and a stabilizer composition in accordance with claim 1.

38. A polyurethane resin composition having improved resistance to deterioration comprising a polyurethane resin and a stabilizer composition in accordance with claim 1.

39. A stabilizer composition for synthetic resins comprising:
(1) at least one 2,2,6,6-tetramethyl piperidyl ether having the formula:

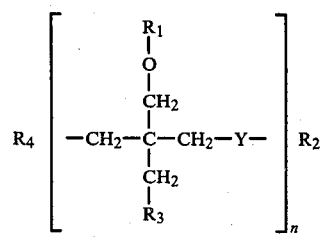

wherein:
$R_1$ is selected from the group consisting of

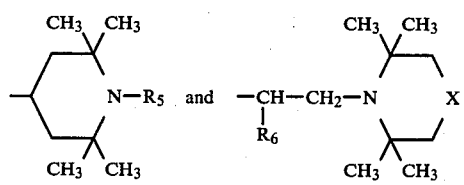

$R_2$ is selected from the group consisting of hydrogen, alkyl, hydroxyalkyl, saturated and unsaturated acyl having from one to about eighteen carbon atoms; $R_1$ and

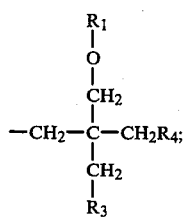

$R_3$ is selected from the group consisting of hydrogen, alkyl and hydroxyalkyl having from one to about eighteen carbon atoms; cycloalkyl and alkylphenyl having from six to about eighteen carbon atoms; and —$OR_1$;

$R_4$ is selected from the group consisting of hydroxyl, alkoxy having from one to about ten carbon atoms, acyloxy having from one to about ten carbon atoms, and —$OR_1$;

$R_5$ is selected from the group consisting of hydrogen, oxy; alkyl, hydroxyalkyl and alkenyl having from one to about eighteen carbon atoms; cycloalkyl and alkylphenyl having from six to about eighteen carbon atoms;

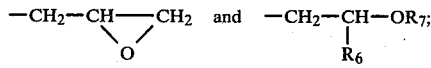

$R_6$ is selected from the group consisting of hydrogen, alkyl and hydroxyalkyl having from one to about eighteen carbon atoms; cycloalkyl and alkylphenyl having from six to about eighteen carbon atoms;

$R_7$ is hydrogen or acyl having from one to about eighteen carbon atoms;

$R_8$ is alkylene having from one to about ten carbon atoms;

X is selected from the group consisting of methylene, —$CH_2$—, carbonyl C=O, >CH—O—$R_7$ and

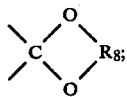

Y is oxy —O— or —O—C—Z—C—O—
                    ‖   ‖
                    O   O where Z is alkylene or thioalkylene having from two to about ten carbon atoms; or phenylene having from six to about ten carbon atoms; and n is a number from 1 to 50; $R_2$ and $R_3$; or $R_2$ and $R_4$ can be taken together to form

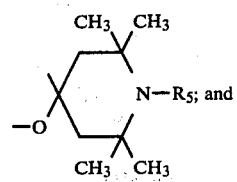

when n is 1 and Y is —O—, $R_2$ and $R_3$ or $R_2$ and $R_4$ can be connected together as a C—C linkage to form a cyclic ring, or

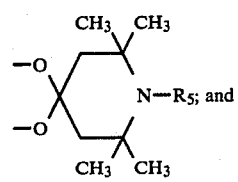

(2) at least one organic phosphite having from one to three organic radicals attached to phosphorus through oxygen, and from about one to about sixty carbon atoms.

40. A stabilizer composition for synthetic resins according to claim 39 in which the organic phosphite has the structure:

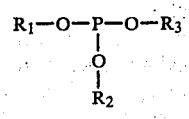

in which $R_1$, $R_2$ and $R_3$ are selected from the group consisting of hydrogen, a cation of a metal, or ammonium, alkyl, alkenyl, aryl, alkaryl, aralkyl, and cycloalkyl groups having from one to about thirty carbon atoms, and at most two of $R_1$, $R_2$ and $R_3$ are hydrogen, a cation of a metal or ammonium.

41. A stabilizer composition for synthetic resins according to claim 39 in which the organic phosphite has the structure:

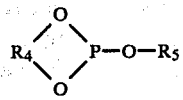

in which $R_4$ is a bivalent organic radical selected from the group consisting of alkylene, arylene, aralkylene, alkarylene and cycloalkylene radicals having from two to about thirty carbon atoms, and $R_5$ is selected from the group consisting of hydrogen, a cation of a metal, or ammonium, alkyl, alkenyl, aryl, alkaryl, aralkyl, and cycloalkyl groups having from one to about thirty carbon atoms, and at most two of $R_1$, $R_2$ and $R_3$ are hydrogen, a cation of a metal or ammonium.

42. A stabilizer composition for synthetic resins according to claim 39 in which the organic phosphite has the structure:

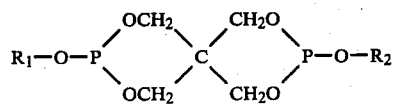

where $R_1$ and $R_2$ are selected from the group consisting of hydrogen, a cation, aryl, alkyl, aryloxyethyl, alkyloxyethyl, aryloxyethoxyethyl, alkyloxyethoxyethyl and alkyloxypolyethoxyethyl having from about 1 to about 30 carbon atoms.

43. A stabilizer composition for synthetic resins according to claim 39 in which the organic phosphite has one of the structures:

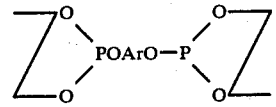

or

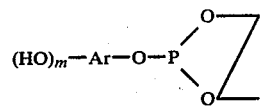

in which
Ar is a mono or bicyclic aromatic nucleus and m is an integer of from 0 to about 5;
Z is selected from the group consisting of one and a plurality of hydrogen, a cation of a metal, or ammonium, alkyl, alkenyl, aryl, alkaryl, aralkyl, and cycloalkyl groups having from one to about thirty carbon atoms, and at most two of $R_1$ taken singly or together in sufficient number to satisfy the valences of the two phosphite oxygen atoms, and such radicals including additional bicyclic aromatic groups of the type $(HO)_m$—Ar.

* * * * *